(12) United States Patent
Dwivedi et al.

(10) Patent No.: US 11,914,506 B2
(45) Date of Patent: Feb. 27, 2024

(54) MACHINE LEARNING TECHNIQUES FOR PERFORMING PREDICTIVE ANOMALY DETECTION

(71) Applicant: Optum, Inc., Minnetonka, MN (US)

(72) Inventors: Sanjay K. Dwivedi, Noida (IN); Alok K. Gupta, Delhi (IN); Nitu, Gautam Buddha Nagar (IN); Kunal Pankaj, Noida (IN)

(73) Assignee: Optum, Inc., Minnetonka, MN (US)

( * ) Notice: Subject to any disclaimer, the term of this patent is extended or adjusted under 35 U.S.C. 154(b) by 171 days.

(21) Appl. No.: 17/678,804

(22) Filed: Feb. 23, 2022

(65) Prior Publication Data

US 2023/0267072 A1   Aug. 24, 2023

(51) Int. Cl.
G06F 11/00 (2006.01)
G06F 11/36 (2006.01)

(52) U.S. Cl.
CPC ...... *G06F 11/3688* (2013.01); *G06F 11/3608* (2013.01)

(58) Field of Classification Search
CPC .................. G06F 11/3608; G06F 11/3688
USPC ........................................................ 714/1–57
See application file for complete search history.

(56) References Cited

U.S. PATENT DOCUMENTS

| | | | |
|---|---|---|---|
| 7,769,624 B1 | 8/2010 | Armentano et al. | |
| 8,213,725 B2* | 7/2012 | Loui ...................... | G06V 20/40 382/226 |
| 8,438,047 B2 | 5/2013 | Curtin et al. | |
| 10,699,808 B2 | 6/2020 | Perry et al. | |
| 2010/0275262 A1* | 10/2010 | Anand ................ | H04L 63/1416 714/48 |
| 2015/0199224 A1* | 7/2015 | Mihnev .................. | H04L 41/16 714/37 |
| 2019/0073580 A1* | 3/2019 | Dzhulgakov .......... | G06N 3/045 |
| 2019/0095999 A1 | 3/2019 | Li et al. | |
| 2019/0303867 A1 | 10/2019 | Nair | |
| 2020/0058381 A1 | 2/2020 | Patel | |
| 2020/0286616 A1 | 9/2020 | Dunn et al. | |
| 2020/0386656 A1* | 12/2020 | Jung .................... | G05B 23/024 |
| 2021/0049503 A1* | 2/2021 | Nourian .............. | G06F 11/3466 |
| 2021/0209688 A1 | 7/2021 | Krishnamurthy et al. | |

OTHER PUBLICATIONS

Islam, Saiful Md et al. "A Systematic Review on Healthcare Analytics: Application and Theoretical Perspective of Data Mining," Healthcare, vol. 6, No. 54, May 23, 2018, pp. 1-43, DOI: 10.3390/healthcare6020054.

* cited by examiner

*Primary Examiner* — Sarai E Butler
(74) *Attorney, Agent, or Firm* — Alston & Bird LLP

(57) ABSTRACT

Various embodiments of the present invention provide methods, apparatus, systems, computing devices, computing entities, and/or the like for performing predictive data analysis operations. For example, certain embodiments of the present invention utilize systems, methods, and computer program products that perform predictive data analysis operations by determining an anomalous event code subset using a pairwise interaction score determination machine learning model.

20 Claims, 13 Drawing Sheets

FIG. 10

Table 1000 (1001):

| Event Code | Event Weight |
|---|---|
| K56 | 0.305 |
| I10 | 0.267 |

FIG. 12

Table 1200:

| First Event Code | Second Event Code |
|---|---|
| K56 | K56 |
| K56 | I10 |
| K56 | E66 |
| ... | ... |
| R09 | R09 |

FIG. 9

Table 900 (901):

| Event Code | Event Weight |
|---|---|
| K56 | 0.285 |
| N39 | 0.416 |
| E66 | 0.278 |
| I10 | 0.267 |
| I25 | 0.289 |
| K21 | 0.281 |
| R09 | 0.270 |

FIG. 11

Table 1100 (1101):

| Event Code | Target Event Weight |
|---|---|
| K56 | 0.295 |
| I10 | 0.267 |
| N39 | 0.416 |
| E66 | 0.278 |
| I25 | 0.267 |
| K21 | 0.281 |
| R09 | 0.270 |

FIG. 13

| Event Code | K56 | I10 | E66 | I25 | K21 | N39 | R09 | Row-Wise Mean Measure | Row-Wise Standard Deviation Measure |
|---|---|---|---|---|---|---|---|---|---|
| K56 | 0.087 | 0.079 | 0.082 | 0.085 | 0.083 | 0.123 | 0.080 |  | 0.015 |
| I10 | 0.079 | 0.071 | 0.074 | 0.077 | 0.075 | 0.111 | 0.072 | 0.079 | 0.004 |
| E66 | 0.082 | 0.074 | 0.077 | 0.080 | 0.078 | 0.116 | 0.075 | 0.078 | 0.003 |
| I25 | 0.085 | 0.077 | 0.080 | 0.084 | 0.081 | 0.120 | 0.078 | 0.081 | 0.006 |
| K21 | 0.083 | 0.075 | 0.078 | 0.081 | 0.079 | 0.117 | 0.076 | 0.079 | 0.004 |
| N39 | 0.123 | 0.111 | 0.116 | 0.120 | 0.117 | 0.173 | 0.112 | 0.117 | 0.000 |
| R09 | 0.080 | 0.072 | 0.075 | 0.078 | 0.076 | 0.112 | 0.073 | 0.082 |  |
| Column-Wise Mean Measure | 0.09 | 0.08 | 0.09 | 0.09 | 0.10 | 0.11 |  |  |  |
| Column-Wise Standard Deviation Measure | 0.02 | 0.02 | 0.02 | 0.02 | 0.03 | 0.00 |  |  |  |

1300 — 1301 — 1302 — 1303 — 1304 — 1305 — 1306

| Event Code | K56 | I10 | E66 | I25 | K21 | N39 | R09 |
|---|---|---|---|---|---|---|---|
| K56 | null | null | null | null | null | null | null |
| I10 | 0.000 | null | null | null | null | null | null |
| E66 | -0.707 | -0.707 | null | null | null | null | null |
| I25 | 1.063 | -0.922 | -0.142 | null | null | null | null |
| K21 | 1.031 | -1.233 | -0.344 | 0.546 | null | null | null |
| N39 | 1.212 | -1.399 | -0.373 | 0.653 | -0.093 | null | null |
| R09 | -0.168 | -0.672 | -0.474 | -0.276 | -0.420 | 2.011 | null |

FIG. 14

| Event Code | K56 | I10 | E66 | I25 | K21 | N39 | R09 |
|---|---|---|---|---|---|---|---|
| K56 | null | null | null | null | null | null | null |
| I10 | -0.579 | null | null | null | null | null | null |
| E66 | 0.387 | -0.469 | null | null | null | null | null |
| I25 | -0.195 | -0.290 | -0.365 | null | null | null | null |
| K21 | -0.335 | -0.420 | -0.482 | -0.623 | null | null | null |
| N39 | 2.022 | 1.778 | 1.490 | 1.411 | 0.707 | null | null |
| R09 | -0.527 | -0.599 | -0.643 | -0.788 | -0.707 | 0.000 | null |

| Event Code | K56 | I10 | E66 | I25 | K21 | N39 | R09 |
|---|---|---|---|---|---|---|---|
| K56 | null | null | 0 | 0 | 0 | 0 | null |
| I10 | null | null | null | 0 | 0 | 2 | null |
| E66 | null | null | null | null | 0 | 0 | null |
| I25 | null | null | null | null | 0 | 0 | null |
| K21 | null | null | null | null | null | 0 | null |
| N39 | null | null | null | null | null | null | 1 |
| R09 | null | null | null | null | null | null | null |

| Event Code | K56 | I10 | E66 | I25 | K21 | R09 |
|---|---|---|---|---|---|---|
| K56 | null | null | 0 | 0 | 0 | null |
| I10 | null | null | null | 0 | 0 | null |
| E66 | null | null | null | null | 0 | null |
| I25 | null | null | null | null | 0 | null |
| K21 | null | null | null | null | null | null |
| R09 | null | null | null | null | null | null |

1700

MACHINE LEARNING TECHNIQUES FOR PERFORMING PREDICTIVE ANOMALY DETECTION

BACKGROUND

Various embodiments of the present invention address technical challenges related to performing predictive data analysis operations and address the efficiency and reliability shortcomings of various existing predictive data analysis solutions, in accordance with at least some of the techniques described herein.

BRIEF SUMMARY

In general, embodiments of the present invention provide methods, apparatus, systems, computing devices, computing entities, and/or the like for performing predictive data analysis operations. For example, certain embodiments of the present invention utilize systems, methods, and computer program products that perform predictive data analysis operations by determining an anomalous code subset of a plurality of event codes by performing a computationally requisite number of event code space refinement iterations until a terminal event code space refinement iteration in which a target anomaly detection matrix data object is generated.

In accordance with one aspect, a method is provided. In one embodiment, the method comprises: generating a target event data object, wherein: (i) the target event data object comprises a target event code subset, (ii) the target event code subset comprises event codes described by a primary event code subset corresponding to the primary event data object and a related event code subset corresponding to a related event data object, (iii) the primary event code subset and related event code subset each comprise one or more event codes and each event code of the primary event code subset and related event code subset is associated with an event weight, and (iv) each event code of the target event code subset is associated with a target event weight; determining a plurality of event code pairs, wherein each event code pair is associated with a first event code and a second event code; for each event code pair, determining, using the pairwise interaction score determination machine learning model, a pairwise interaction score based at least in part on the corresponding target event weight for the first event code associated with the event code pair and the corresponding target event weight for the second event code associated with the event code pair; performing a computationally requisite number of event code space refinement iterations until a terminal event code space refinement iteration in which a target anomaly detection matrix data object is generated, wherein performing a particular event code space refinement iteration comprises: during each non-initial event code space refinement iteration, updating the target event code subset generated by a preceding event code space refinement iteration to remove n target event codes; determining an event interaction matrix data object, wherein: (i) each row of the event interaction matrix data object is associated with a row-wise event code that is selected from either the first event code or second event code of the event code pair, (ii) each column of the event interaction matrix is associated with a column-wise event code that is selected from either the first event code or second event code of the event code pair, and (iii) each value of the event interaction matrix describes the pairwise interaction score whose first event code corresponds to the row-wise event code for the value and whose second event code corresponds to the column-wise event code for the value; determining a row-wise interaction triangular matrix data object, wherein each non-null value of the row-wise interaction triangular matrix data object is determined based at least in part on a corresponding event interaction matrix value of the event interaction matrix data object, a row-wise mean measure for a corresponding row of the event interaction matrix data object, and a row-wise standard deviation measure for a corresponding row of the event interaction matrix data object; determining a column-wise interaction triangular matrix data object, wherein each non-null value of the column-wise interaction triangular matrix data object is determined based at least in part on the corresponding event interaction matrix of the event interaction matrix data object, a column-wise mean measure for a corresponding row of the event interaction matrix data object, and a column-wise standard deviation measure for a corresponding row of the event interaction matrix data object; and generating an anomaly detection matrix data object, wherein each non-null value of the anomaly detection matrix data object is determined based at least in part on a corresponding row-wise matrix value of the row-wise interaction triangular matrix data object and a corresponding column-wise matrix value of the column-wise interaction triangular matrix data object; determining an anomalous code subset of the plurality of event codes based at least in part on the n target event codes for the terminal event code space refinement iteration; and performing one or more actions based at least in part on the anomalous code subset In accordance with another aspect, a computer program product is provided. The computer program product may comprise at least one computer-readable storage medium having computer-readable program code portions stored therein, the computer-readable program code portions comprising executable portions configured to: generate a target event data object, wherein: (i) the target event data object comprises a target event code subset, (ii) the target event code subset comprises event codes described by a primary event code subset corresponding to the primary event data object and a related event code subset corresponding to a related event data object, (iii) the primary event code subset and related event code subset each comprise one or more event codes and each event code of the primary event code subset and related event code subset is associated with an event weight, and (iv) each event code of the target event code subset is associated with a target event weight; determine a plurality of event code pairs, wherein each event code pair is associated with a first event code and a second event code; for each event code pair, determine, using the pairwise interaction score determination machine learning model, a pairwise interaction score based at least in part on the corresponding target event weight for the first event code associated with the event code pair and the corresponding target event weight for the second event code associated with the event code pair; perform a computationally requisite number of event code space refinement iterations until a terminal event code space refinement iteration in which a target anomaly detection matrix data object is generated, wherein performing a particular event code space refinement iteration comprises: during each non-initial event code space refinement iteration, update the target event code subset generated by a preceding event code space refinement iteration to remove n target event codes; determine an event interaction matrix data object, wherein: (i) each row of the event interaction matrix data object is associated with a row-wise event code that is selected from either the first event code or second event code of the event code pair, (ii) each column of the event interaction matrix is associated with a column-wise event code that is selected from either the first event code or second event code of the event code pair, and (iii) each value of the event interaction matrix describes the pairwise interaction score whose first event code corresponds to the row-wise event code for the value and whose second event code corresponds to the column-wise event code for the value; determine a row-wise interaction triangular matrix data object, wherein each non-null value of the row-wise interaction triangular matrix data object is determined based at least in part on a corresponding event interaction matrix value of the event interaction matrix data object, a row-wise mean measure for a corresponding row of the event interaction matrix data object, and a row-wise standard deviation measure for a corresponding row of the event interaction matrix data object; determine a column-wise interaction triangular matrix data object, wherein each non-null value of the column-wise interaction triangular matrix data object is determined based at least in part on the corresponding event interaction matrix of the event interaction matrix data object, a column-wise mean measure for a corresponding row of the event interaction matrix data object, and a column-wise standard deviation measure for a corresponding row of the event interaction matrix data object; and generate an anomaly detection matrix data object, wherein each non-null value of the anomaly detection matrix data object is determined based at least in part on a corresponding row-wise matrix value of the row-wise interaction triangular matrix data object and a corresponding column-wise matrix value of the column-wise interaction triangular matrix data object; determine an anomalous code subset of the plurality of event codes based at least in part on the n target event codes for the terminal event code space refinement iteration; and perform one or more actions based at least in part on the anomalous code subset.

In accordance with yet another aspect, an apparatus comprising at least one processor and at least one memory including computer program code is provided. In one embodiment, the at least one memory and the computer program code may be configured to, with the processor, cause the apparatus to: generate a target event data object, wherein: (i) the target event data object comprises a target event code subset, (ii) the target event code subset comprises event codes described by a primary event code subset corresponding to the primary event data object and a related event code subset corresponding to a related event data object, (iii) the primary event code subset and related event code subset each comprise one or more event codes and each event code of the primary event code subset and related event code subset is associated with an event weight, and (iv) each event code of the target event code subset is associated with a target event weight; determine a plurality of event code pairs, wherein each event code pair is associated with a first event code and a second event code; for each event code pair, determine, using the pairwise interaction score determination machine learning model, a pairwise interaction score based at least in part on the corresponding target event weight for the first event code associated with the event code pair and the corresponding target event weight for the second event code associated with the event code pair; perform a computationally requisite number of event code space refinement iterations until a terminal event code space refinement iteration in which a target anomaly detection matrix data object is generated, wherein performing a particular event code space refinement iteration comprises: during each non-initial event code space refinement iteration, update the target event code subset generated by a preceding event code space refinement iteration to remove n target event codes; determine an event interaction matrix data object, wherein: (i) each row of the event interaction matrix data object is associated with a row-wise event code that is selected from either the first event code or second event code of the event code pair, (ii) each column of the event interaction matrix is associated with a column-wise event code that is selected from either the first event code or second event code of the event code pair, and (iii) each value of the event interaction matrix describes the pairwise interaction score whose first event code corresponds to the row-wise event code for the value and whose second event code corresponds to the column-wise event code for the value; determine a row-wise interaction triangular matrix data object, wherein each non-null value of the row-wise interaction triangular matrix data object is determined based at least in part on a corresponding event interaction matrix value of the event interaction matrix data object, a row-wise mean measure for a corresponding row of the event interaction matrix data object, and a row-wise standard deviation measure for a corresponding row of the event interaction matrix data object; determine a column-wise interaction triangular matrix data object, wherein each non-null value of the column-wise interaction triangular matrix data object is determined based at least in part on the corresponding event interaction matrix of the event interaction matrix data object, a column-wise mean measure for a corresponding row of the event interaction matrix data object, and a column-wise standard deviation measure for a corresponding row of the event interaction matrix data object; and generate an anomaly detection matrix data object, wherein each non-null value of the anomaly detection matrix data object is determined based at least in part on a corresponding row-wise matrix value of the row-wise interaction triangular matrix data object and a corresponding column-wise matrix value of the column-wise interaction triangular matrix data object; determine an anomalous code subset of the plurality of event codes based at least in part on the n target event codes for the terminal event code space refinement iteration; and perform one or more actions based at least in part on the anomalous code subset.

BRIEF DESCRIPTION OF THE DRAWINGS

Figure 1:
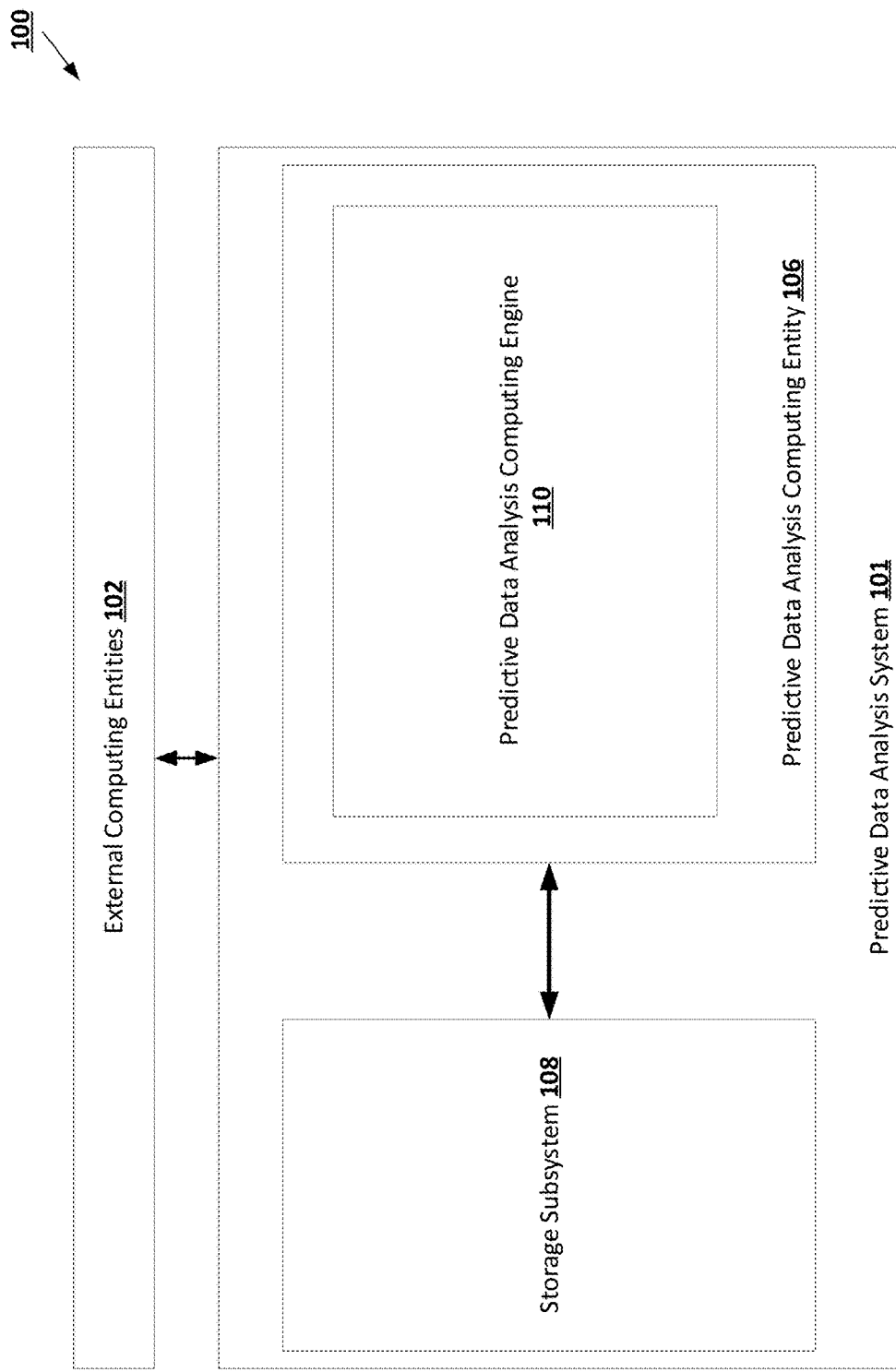

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
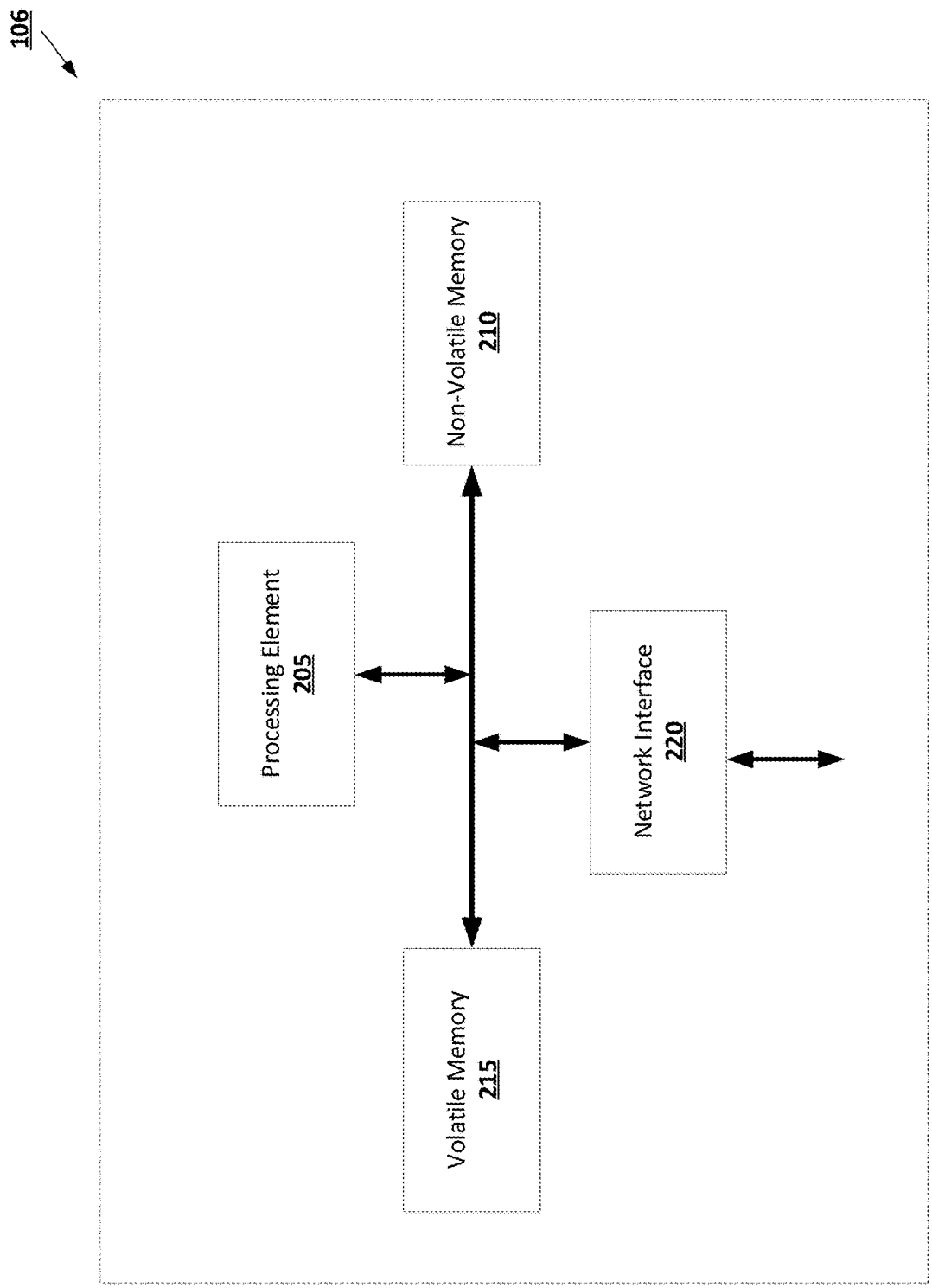

FIG. 2 provides an example predictive data analysis computing entity in accordance with some embodiments discussed herein.

Figure 3:
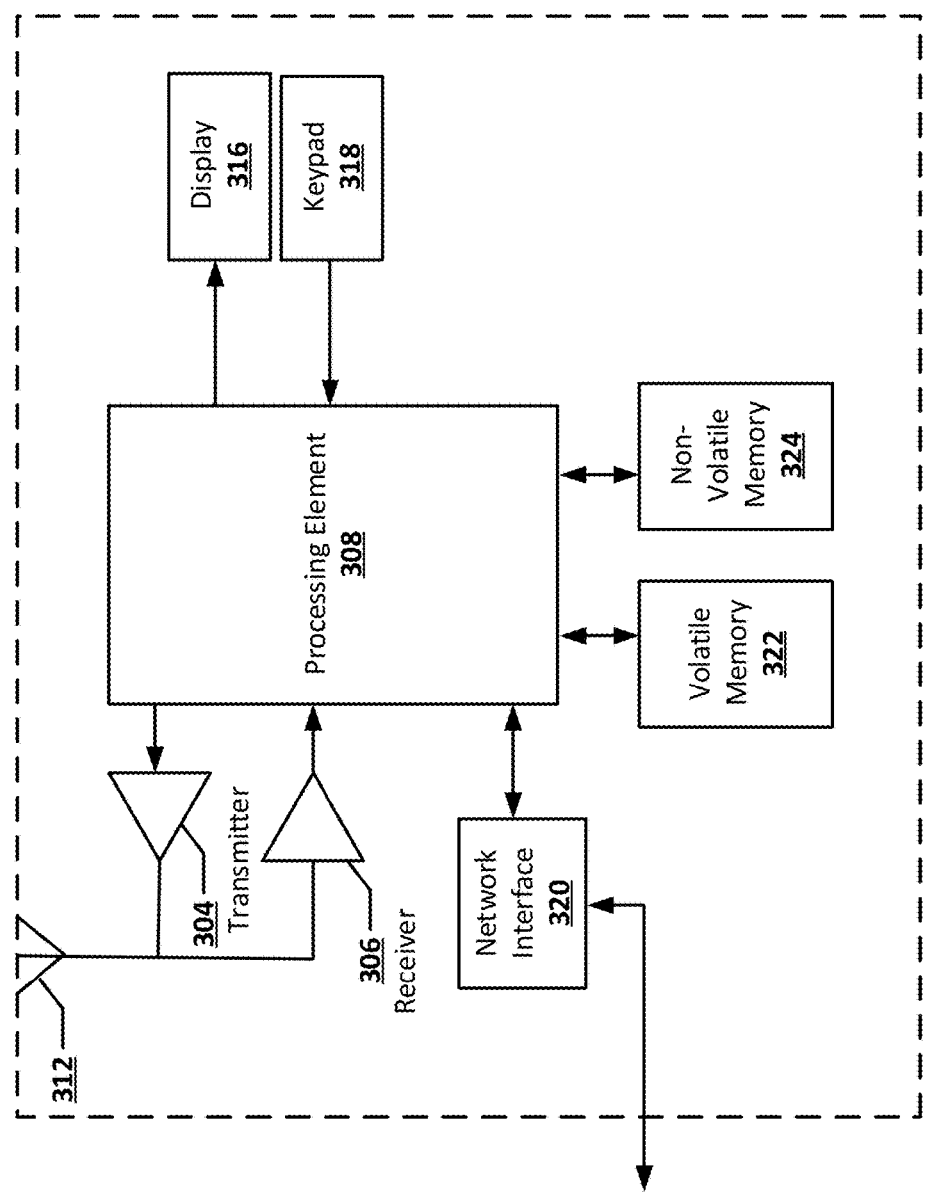

FIG. 3 provides an example client computing entity in accordance with some embodiments discussed herein.

Figure 4:
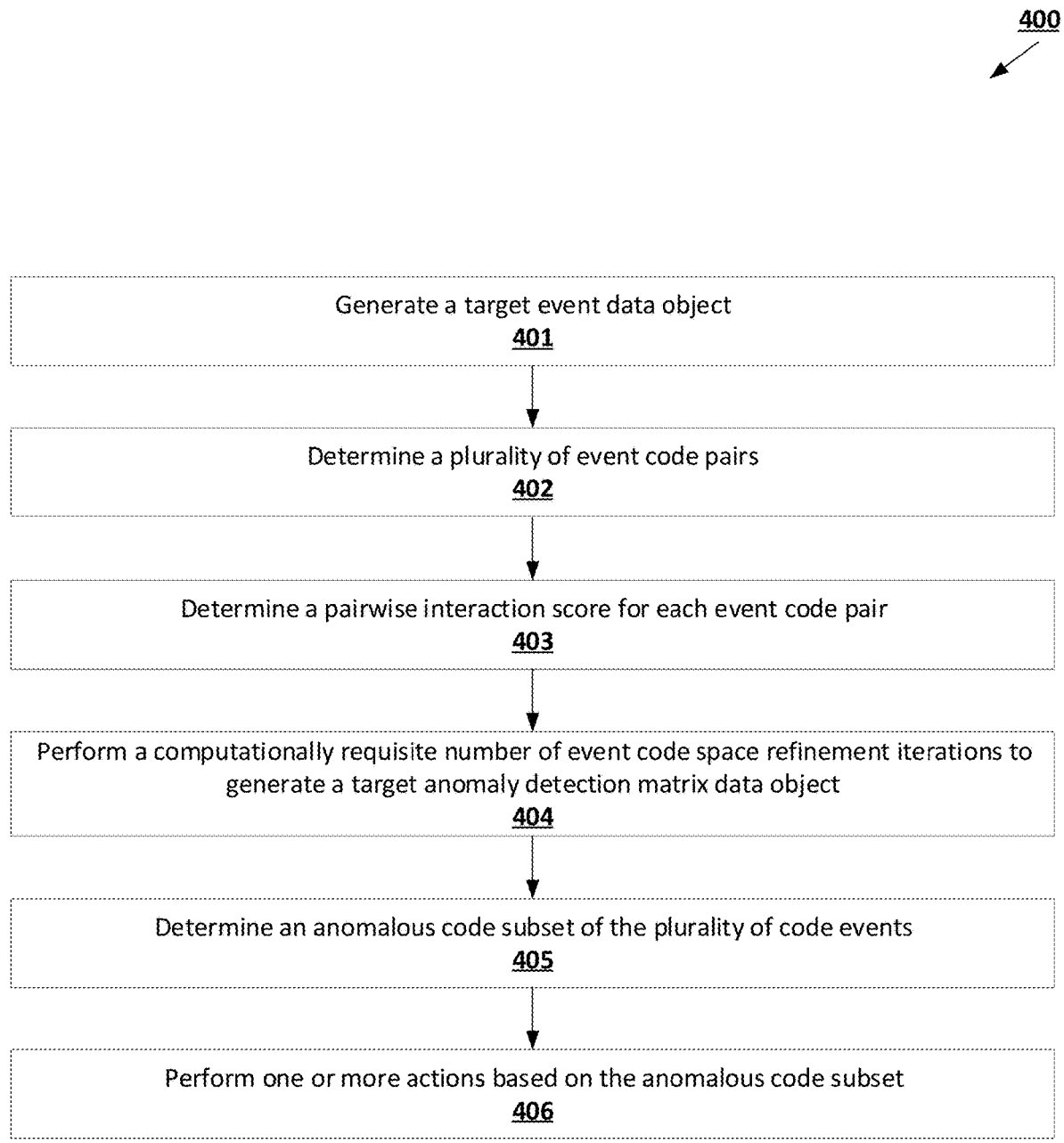

FIG. 4 is a flowchart diagram of an example process for determining an anomalous code subset in accordance with some embodiments discussed herein.

Figure 5:
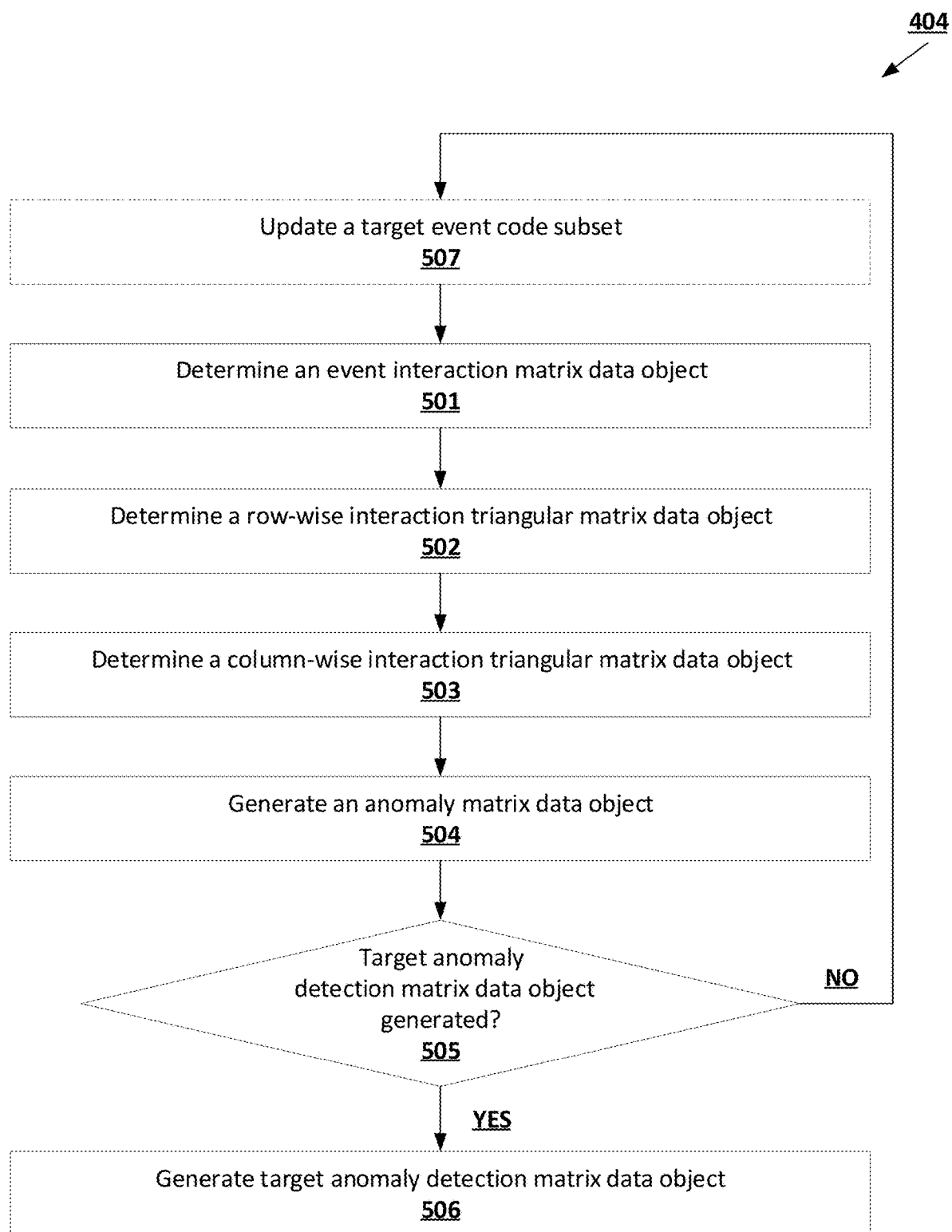

FIG. 5 is a flowchart diagram of an example process for a particular event code space refinement iteration in accordance in accordance with some embodiments discussed herein.

Figure 6:
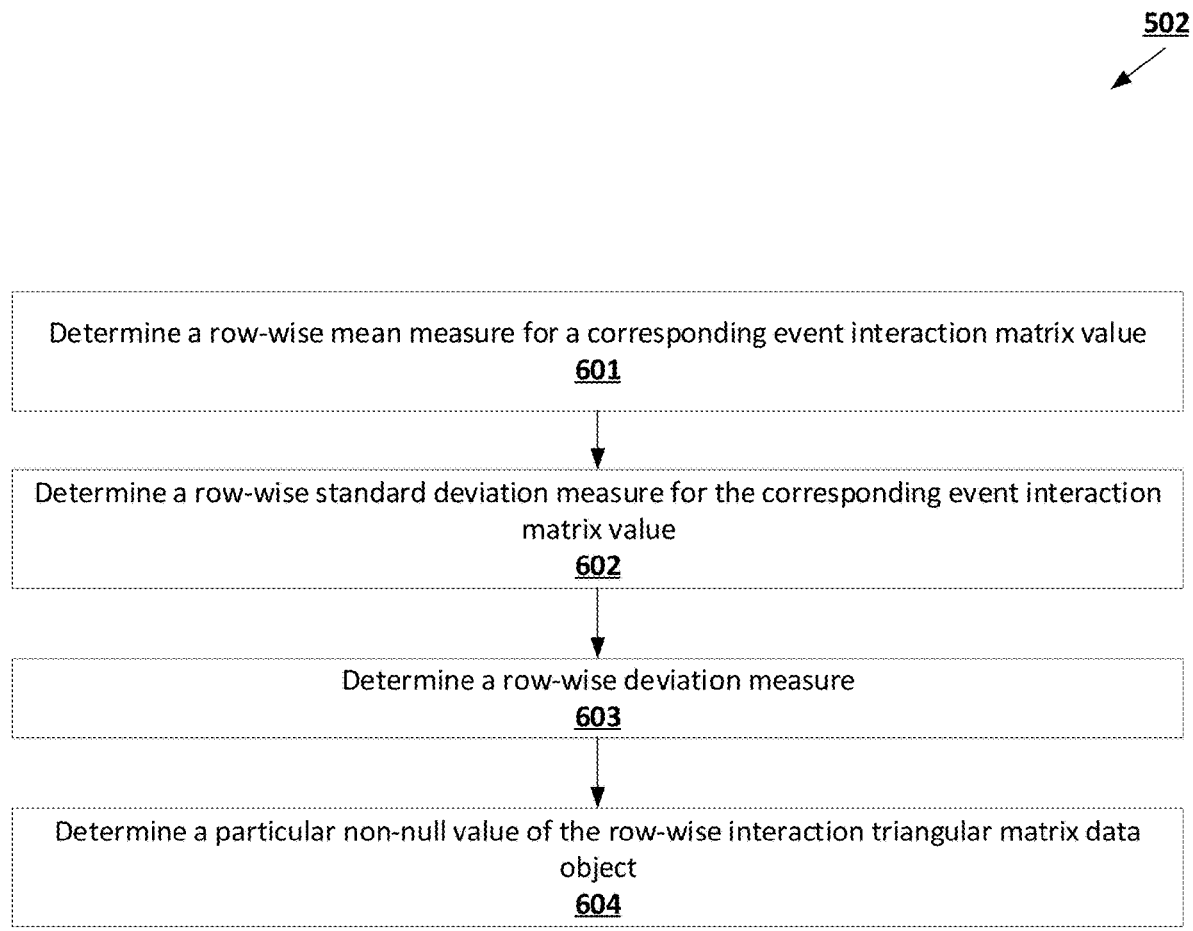

FIG. 6 is a flowchart diagram of an example process for determining a non-null value of a row-wise interaction triangular matrix data object in accordance with some embodiments discussed herein.

Figure 7:
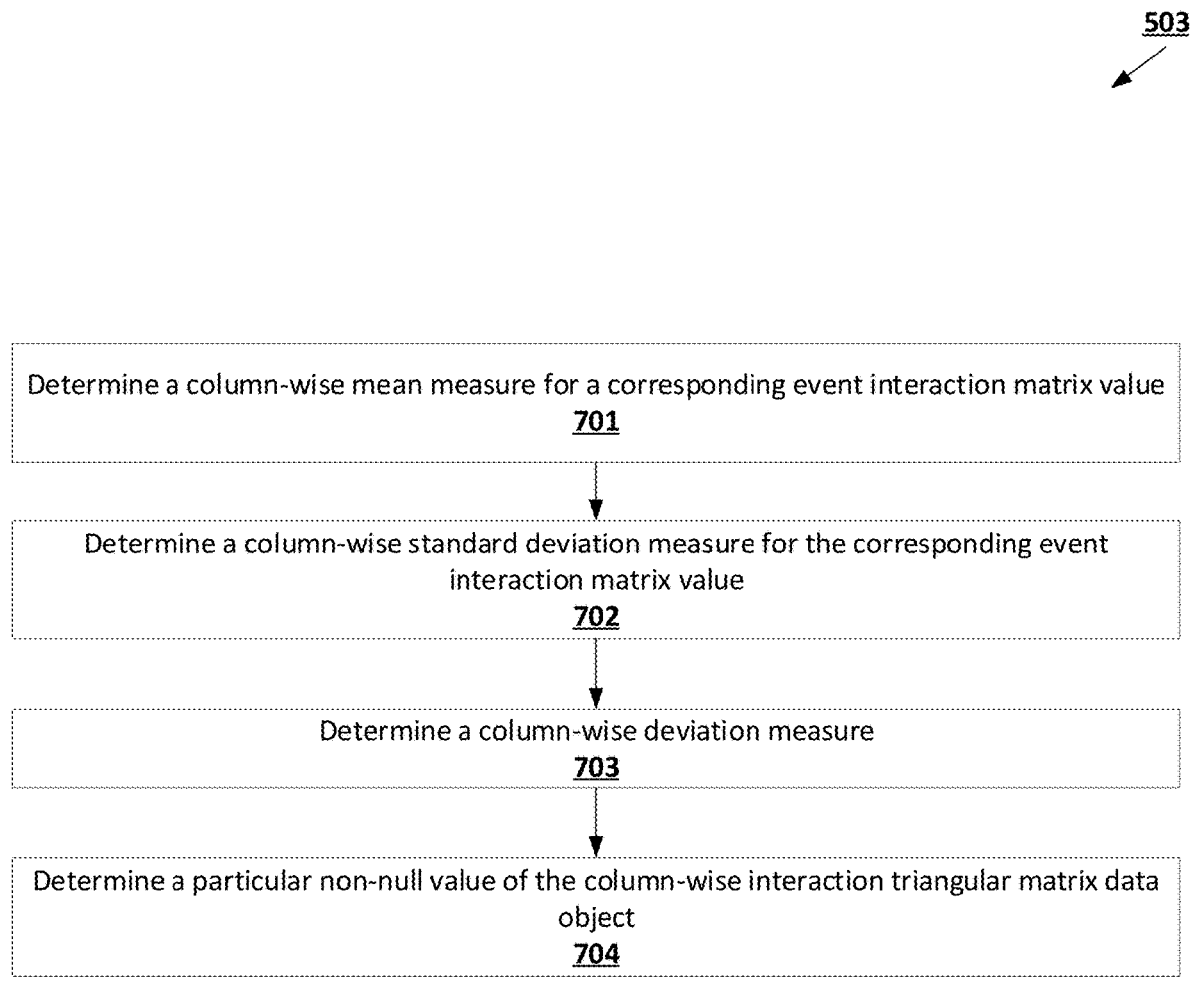

FIG. 7 is a flowchart diagram of an example process for determining a non-null value of a column-wise interaction triangular matrix data object in accordance with some embodiments discussed herein.

Figure 8:
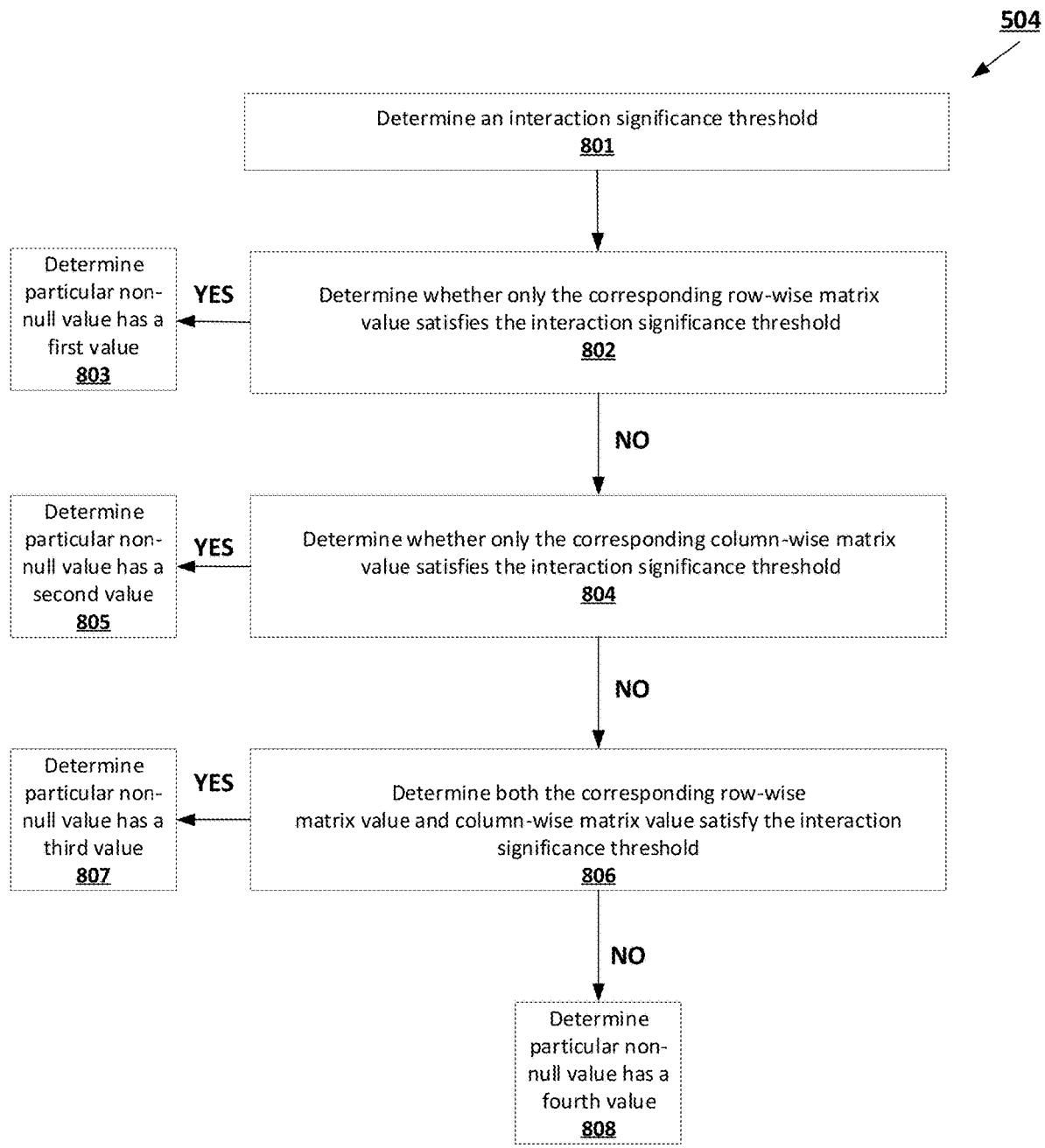

FIG. 8 is a flowchart diagram of an example process for determining a particular non-null value of an anomaly detection matrix data object in accordance with some embodiments discussed herein.

FIG. 9 provides an operational example of a primary event data object in accordance with some embodiments discussed herein.

FIG. 10 provides an operational example of a related event data object in accordance with some embodiments discussed herein.

FIG. 11 provides an operational example of a target event data object in accordance with some embodiments discussed herein.

FIG. 12 provides an operational example of a plurality of event code pairs in accordance with some embodiments discussed herein.

FIG. 13 provides an operational example of an event interaction matrix data object in accordance with some embodiments discussed herein.

FIG. 14 provides an operational example of a row-wise interaction triangular matrix data object in accordance with some embodiments discussed herein.

FIG. 15 provides an operational example of a column-wise interaction triangular matrix data object in accordance with some embodiments discussed herein.

FIG. 16 provides an operational example of an anomaly detection matrix data object in accordance with some embodiments discussed herein.

FIG. 17 provides an operational example of a target anomaly detection matrix data object in accordance with some embodiments discussed herein.

Figure 18:
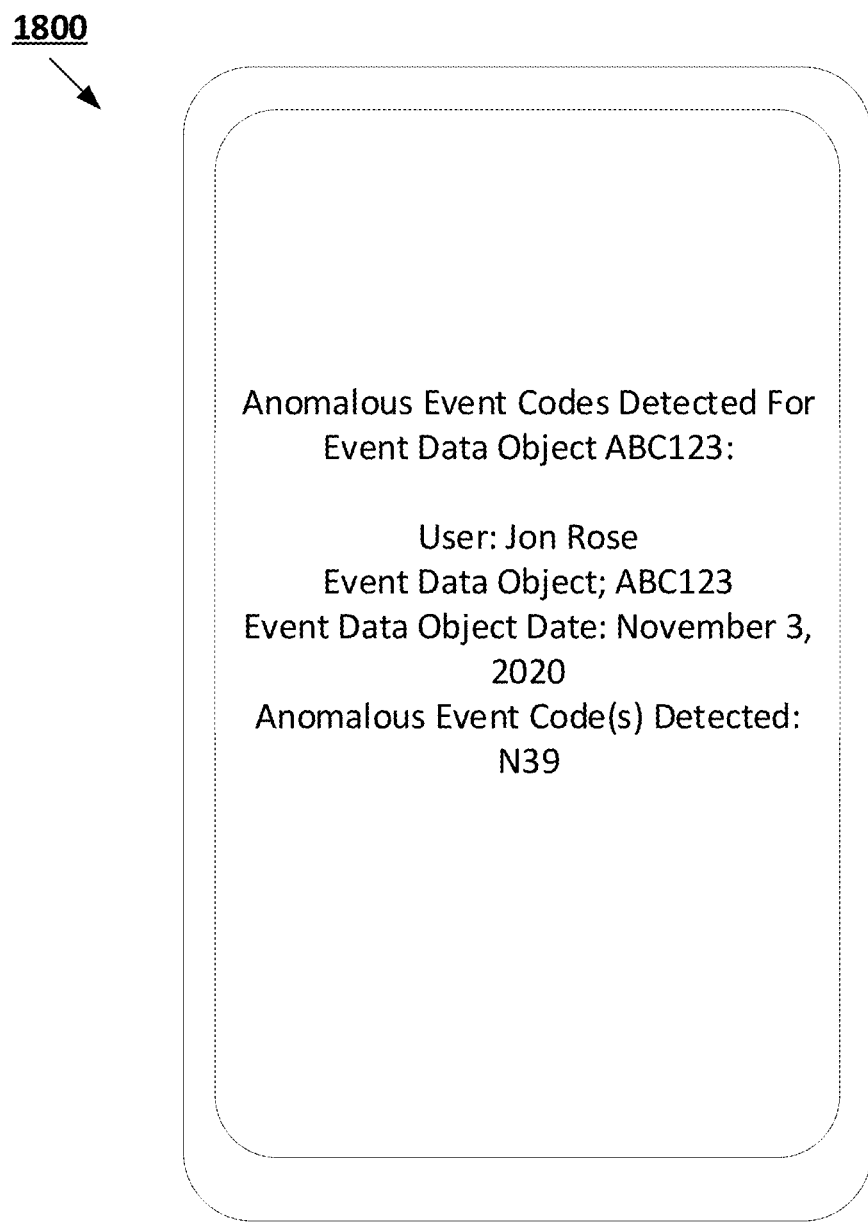

FIG. 18 provides an operational example of an alert notification that may be provided in some embodiments, discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis tasks.

I. Overview and Technical Improvements

Event data objects, such as an event data object pertaining to claim data which relates to a patient stay at a medical facility, may require processing, which can be resource-intensive, time-consuming, and inaccurate. Currently, such event data is reviewed manually using an inefficient multi-step processes (e.g., medical record requests, medical record review, analysis of patient behavior, etc.) which requires heavy resource utilization (both manual and computational) and financial expenditure and may still result in errors. As such, an alternate event data object processing method may be beneficial such that event code anomalies may be automatically detected.

Various embodiments of the present invention enable predictive anomaly detection with respect to a primary event data object. The disclosed techniques enable using a pairwise interaction score machine learning model to determine a pairwise interaction score for each event code pair of a plurality of event code pairs indicative of the significance of interaction between the event codes described by the particular event code pair. The pairwise interaction score may be used in part to generate an anomaly detection matrix data object, which may in turn be used to determine an anomalous code subset which includes one or more anomalous event codes. As such, this allows for dynamic and predictive detection of anomalous event codes within a primary event data object and thus avoids the need for manual review. Furthermore, this allows for the early detection of anomalous event codes which reduces the need for computation resources at a later time after the anomalous event codes have been processed. As such, the disclosed techniques for predictive anomaly detection improve effectiveness and efficiency of various predictive data analysis operations. In doing so, various embodiments of the present invention make further important technical contributions to the fields of predictive data analysis and machine learning.

Various embodiments of the present invention address technical challenges related to enhancing operational reliability of anomaly handling systems by performing anomaly detection techniques that enable early detection of the number of anomaly cases provided to the anomaly handling systems. In some embodiments, by early detection of the number of anomaly cases provided to the anomaly handling systems, various embodiments of the present invention enable performing operational load balancing for the anomaly handling systems by allocating the right amount of computational resources and deallocating unnecessary computational resources. In this way, various embodiments of the present invention enhance operational reliability and resource usage efficiency of anomaly handling systems.

II. Definitions

The term "primary event data object" may refer to a data construct that is configured to describe a primary event of interest for a particular user of interest. In particular, the primary event data object may describe a primary event code subset which includes one or more event codes and an event weight for each event code of the primary event code subset. The event codes included in the primary event code subset may correspond to a plurality of candidate event codes and may describe the particular event which pertains to the user of interest. Furthermore, the primary event data object may be assigned an event category from a plurality of event categories. In some embodiments, the candidate event categories may include a bridge event category, a chronicle event category, or a new event category. In some embodiments, one or more event data objects pertaining to the particular user of interest may be included in an ordered sequence of event data objects. The event data objects may be ordered in chronological order. For example, the ordered sequence of event data objects may include event data objects ordered chronologically in a particular sequence position between 1 and n, where n is the position of the most recent event data object (e.g., the primary event data object) and 1 is the position of the oldest event data object. The event category may be assigned based at least in part on the event codes included within the primary event code subset and the event codes included within one or more other event code subsets associated with preceding event data objects. For example, in an instance the primary event code subset at position n within the ordered sequence includes one or more event codes also included within an immediately preceding event data object at position n−1 within the ordered sequence, the event category may be determined to be a bridge event category. As another example, in an instance the primary event code subset at position n includes one or more event codes also included in an event code subset at an mth position, where m inclusively includes any position between 1 and n−2, the event category may be determined to be a chronicle event category. As yet another example, in an instance the primary event code subset at position n only includes event codes which are not included within any preceding event code subset, the event category may be determined to be a new event category.

The term "related event data object" may refer to a data construct that is configured to describe an event that is related to the primary event of interest for a particular user of interest. In particular, the related event data object may describe a related event code subset which includes one or more event codes and an event weight for each event code of the related event code subset. The event codes included in the related event code subset may correspond to a plurality of candidate event codes and may describe the particular event which pertains to the user of interest. The related event data object may be determined based at least in part on an event category for a primary event data object. For example, in an instance the event category for the primary event data object is determined to be a bridge event category, the related event data object may be determined to be the immediately preceding event data object in an ordered sequence of event data objects. As another example, in an instance the event category for the primary event data object is determined to be a chronicle event category, the related event data object is determined to be an mth preceding event data object in an ordered sequence of event data objects, where m is determined based at least in part on a predefined historical exploration hyper-parameter for the ordered sequence. As yet another example, in an instance the event category for the primary event data object is determined to be a new event category, the related event data object is determined to be the same event data object as the primary event data object.

The term "target event data object" may refer to a data construct that is configured to describe one or more event code subsets to be used for predictive anomaly detection. The target event data object may include a target event code subset that includes the event codes from the primary event code subset corresponding to the primary event data object and the related event code subset corresponding to the related event data object. Additionally, each event code of the primary event code subset and the related event code subset may be associated with a particular event weight as described by the corresponding event data object. Furthermore, each event code of the target event code subset may be associated with a target event weight. The target event weight may be determined for each event code based at least in part on the event weight as described by the primary event data object and/or related event data object. In an instance a particular event code is included in both the primary event code subset and the related event code subset, the target event weight is determined based at least in part on both the event weight corresponding to the primary event code subset and the event weight corresponding to the related event code subset. In some embodiments, the target event weight may be determined using one or more mathematical and/or logical operations. For example, in an instance both the primary event code subset and the related event code subset include an event code of "K56", the target event weight may be determined based at least in part on the event weight as described by both the primary event data object and the related event data object. As such, if a primary event data object describes an event weight of 0.285 for the event code "K56" and the related event data object describes an event weight of 0.305 for the event code "K56", the target event weight for the event code "K56" may be determined using the average of the event weights to yield a target event weight of 0.295. In some embodiments, the event weight for an ith event code which relates a diagnosis code is determined using the equation $$IDW_i = \frac{\sum_j \sum_k \sum_l C_{ijkl} Dw_{ijkl} F_{ijkl}}{\sum_j \sum_k \sum_l F_{ijkl}},$$

where: (i) $IDW_i$ is the event weight for the ith event code, (ii) $C_{ijkl}$ is a contribution measure for the ith event code, jth medical condition, kth severity type, and lth family, (iii) $Dw_{ijkl}$ is the diagnosis related group (DRG) weight for the ith event code, jth medical condition, kth severity type, and lth family, and (iv) $F_{ijkl}$ is the occurrence frequency of ith event code, jth medical condition, kth severity type, and lth family (e.g., occurrence frequency among historical claim data, such as historical claim data related to inpatient/institutional claims). In some embodiments, each event code is associated with a diagnosis code (e.g., an International Classification of Diseases (ICD) code). For example, an event code may be determined based at least in part on all or a portion of (e.g., the first three characters) of a corresponding diagnosis code.

The term "event code pair" may refer to a data construct that is configured to describe an ordered combination of event codes. The event code pair may describe a first event code from the target event code subset and a second event code from the target event code subset. A plurality of event code pairs may be determined such that all combinations of event codes as described by the target event code subset are described. For example, if a target event code subset includes the event codes K56 and I10, a first event code pair may describe a first event code of K56 and a second event code pair of K56, a second event code pair may describe a first event code of K56 and a second event code pair of I10, a third event code pair may describe a first event code of I10 and a second event code pair of K56, and a fourth event code pair may describe a first event code of I10 and a second event code pair of I10.

The term "pairwise interaction score determination machine learning model" may refer to a data construct that describes parameters, hyper-parameters, and/or defined operations of a machine learning model that is configured to process a plurality of event code pairs in order to generate a pairwise interaction score for each event code pair of the plurality of event code pairs. In some embodiments, the pairwise interaction score determination machine learning model may generate the pairwise interaction score for a particular event code pair based at least in part on the corresponding target event weight for the first event code and the corresponding target event weight for the second event code. The generated pairwise interaction score may be indicative of the significance of interaction between the event codes described by the particular event code pair. In some embodiments, the pairwise interaction score determination machine learning model may comprise a neural network. The output of the pairwise interaction score determination machine learning model may comprise a vector, where each value of the vector describes a pairwise interaction score for a particular event code pair. In some embodiments, the output of the pairwise interaction score determination machine learning model may comprise an atomic value that describes the pairwise interaction score for the particular event code pair. In some embodiments, the pairwise interaction score determination machine learning model may be trained using historical event code interaction data as described by historical event data objects. In some embodiments, the pairwise interaction score determination machine learning model performs operations of a defined equation, such as an equation that determines the pairwise interaction score for a set of event n codes (e.g., a pair of event codes) based at least in part on the result of multiplication of the n target event weights associated with the n event codes. In some embodiments, the pairwise interaction score determination machine learning model is a rule-based model that is configured to perform one or more operations that are not dependent on any trained parameters, such as one or more operations of a defined equation as described in the preceding sentence. In some embodiments, the pairwise interaction score determination machine learning model is configured to process n target event weights associated with the n event codes using one or more trained parameters (e.g., one or more trained parameters of a feedforward neural network machine learning model, such as a fully-connected feedforward neural network machine learning model) to generate the pairwise interaction score for the n event codes.

The term "event interaction matrix data object" may refer to a data construct that is configured to describe that is one or more pairwise interaction score for each event code pair of a plurality of event code pairs. The event interaction matrix data object may include one or more rows and one or more columns. Each row of the one or more rows may be associated with a row-wise event code that is selected from either the first event code or second event code of the event code pair. Each column of the one or more columns may be associated with a column-wise event code that is selected from either the first event code or second event code of the event code pair. In some embodiments, the one or more row-wise event codes are selected from the first event code and the one or more columns-wise event codes are selected from the second event code. Alternatively, the one or more column-wise event codes are selected from the first event code and the one or more row-wise event codes are selected from the second event code. For example, for an event code pair where "K56" is the first event code and "I10" is the second event code, a row-wise event code of the event interaction matrix data object may correspond to the event code "K56" and a column-wise event code of the event interaction matrix data object may correspond to the event code "I10". Alternatively, a column-wise event code of the event interaction matrix data object may correspond to the event code "K56" and a row-wise event code of the event interaction matrix data object may correspond to the event code "I10" for the event code pair. Additionally, the event interaction matrix data object includes one or more values. Each value of the event interaction matrix data object describes the pairwise interaction score whose first event code corresponds to the row-wise event code for the value and whose second event code corresponds to the column-wise event code for the value.

The term "row-wise interaction triangular matrix data object" may refer to a data construct that is configured to describe row-wise values. The row-wise interaction triangular matrix data object may include one or more rows and one or more columns based at least in part on the corresponding event interaction matrix data object. Each row of the one or more rows may be associated with a row-wise event code and each column of the one or more columns may be associated with a column-wise event code as defined by the event interaction matrix data object. The row-wise interaction triangular may include one or more values which may include one or more non-null values and/or one or more null values.

The term "column-wise interaction triangular matrix data object" may refer to a data construct that is configured to describe column-wise values. The column-wise interaction triangular matrix data object may include one or more rows and one or more columns based at least in part on the corresponding event interaction matrix data object. Each row of the one or more rows may be associated with a row-wise event code and each column of the one or more columns may be associated with a column-wise event code as defined by the event interaction matrix data object. The column-wise interaction triangular may include one or more values which may include one or more non-null values and/or one or more null values.

The term "anomaly detection matrix data object" may refer to a data construct that is configured to describe one or more values indicative of whether one or more values of a row-wise matrix value and/or one or more values of a column-wise matrix value satisfy one or more interaction significance threshold values. The anomaly detection matrix data object may include one or more rows and one or more columns. Each row of the one or more rows may be associated with a row-wise event code that is selected from either the first event code or second event code of the event code pair. Each column of the one or more columns may be associated with a column-wise event code that is selected from either the first event code or second event code of the event code pair. The anomaly detection matrix data object may include one or more values, including one or more non-null values and one or more null values. Each value of one or more values of the anomaly detection matrix data object may be determined based at least in part on a corresponding row-wise matrix value of the row-wise interaction triangular matrix data object and a corresponding column-wise matrix value of the column-wise interaction triangular matrix data object.

The term "target anomaly detection matrix data object" may refer to a data construct that is configured to describe one or more target values. The target anomaly detection matrix data object may include one or more rows and one or more columns. Each row of the one or more rows may be associated with a row-wise event code that is selected from either the first event code or second event code of the event code pair. Each column of the one or more columns may be associated with a column-wise event code that is selected from either the first event code or second event code of the event code pair. The target anomaly detection matrix data object may include one or more values, including one or more non-null values and one or more null values. Each value of one or more values of the target anomaly detection matrix data object may be determined based at least in part on a corresponding row-wise matrix value of the row-wise interaction triangular matrix data object and a corresponding column-wise matrix value of the column-wise interaction triangular matrix data object. Each non-null value of the target anomaly detection matrix data object may be a zero value.

The term "anomalous code subset" may refer to a data construct that is configured to describe event codes which were removed during a terminal event code space refinement iteration. For example, if the event codes "K56" and "110" were the target event codes removed from the target event code subset during the terminal event code space refinement iteration, the anomalous code subset may include the event codes "K56" and "110".

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a scripting language, a database query or search language, and/or a report writing language. In one or more example embodiments, a software component comprising instructions in one of the foregoing examples of programming languages may be executed directly by an operating system or other software components without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid-state card (SSC), solid-state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is processing a primary event data object and related event data object to detect anomalous event codes with respect to the primary event data object.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in several different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application-specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention enable predictive anomaly detection with respect to a primary event data object. The disclosed techniques enable using a pairwise interaction score machine learning model to determine a pairwise interaction score for each event code pair of a plurality of event code pairs indicative of the significance of interaction between the event codes described by the particular event code pair. The pairwise interaction score may be used in part to generate an anomaly detection matrix data object, which may in turn be used to determine an anomalous code subset which includes one or more anomalous event codes. As such, this allows for dynamic and predictive detection of anomalous event codes within a primary event data object and thus avoids the need for manual review. Furthermore, this allows for the early detection of anomalous event codes which reduces the expenditure of computation resource at a later time after the anomalous event codes have been processed. As such, the disclosed techniques for predictive anomaly detection improve effectiveness and efficiency of various predictive data analysis operations. In doing so, various embodiments of the present invention make further important technical contributions to the fields of predictive data analysis and machine learning.

FIG. 4 is a flowchart diagram of an example process 400 for determining an anomalous code subset. Via the various steps/operations of the process 400, the predictive data analysis computing entity 106 can use predictive insights determined based at least in part on the anomalous code subset.

The process 400 begins at step/operation 401 when the predictive data analysis computing entity 106 generates a target event data object. The target event data object may be generated based at least in part on a primary event data object and related event data object for a particular user of interest. The target event data object may include a target event code subset which includes event codes described by a primary event code subset corresponding to the primary event data object and a related event code subset corresponding to the related event data object.

In some embodiments, the predictive data analysis computing entity 106 may receive and/or identify a primary event data object for a particular user of interest. For example, the predictive data analysis computing entity 106 may receive the primary event data object from one or more client computing entities 102. As another example, the predictive data analysis computing entity 106 may receive an indication of a particular user of interest and may identify a primary event data object from a plurality of event data objects associated with the user. For example, the predictive data analysis computing entity 106 may query storage subsystem 108 to identify the event data object associated with a position in an ordered sequence corresponding to the most recent event, as the primary event data object.

The primary event data object may describe a primary event code subset which includes one or more event codes and an event weight for each event code of the primary event code subset. The event codes included in the primary event code subset may correspond to a plurality of candidate event codes and may describe the particular event which pertains to the user of interest. For example, the primary event data object may correspond to a recent user stay within a medical facility and the event codes included in the primary event code subset may correspond to diagnosis codes associated with the user stay. Furthermore, the event weights for each event code may be dependent upon the specific event. For example, a particular event code of "K56" may correspond to an event weight of 0.285 for one event but may correspond to an event weight of 0.305 for a different event.

The predictive data analysis computing entity 106 may assign an event category to the primary event data object from a plurality of event categories. In some embodiments, the candidate event categories may include a bridge event category, a chronicle event category, and a new event category. In some embodiments, one or more event data objects pertaining to the particular user of interest may be included in an ordered sequence of event data objects and stored in a storage subsystem 108. The event data objects may be ordered in chronological order. As such, the predictive data analysis computing entity 106 may determine the chronological sequence order for the event data objects for a particular user. For example, the ordered sequence of event data objects may include event data objects ordered chronologically in a particular sequence position from 1 and n, where n is the position of the most recent event data object (e.g., the primary event data object) and 1 is the position of the oldest event data object. The predictive data analysis computing entity 106 may assign the event category based at least in part on the event codes included within the primary event code subset and the event codes included within one or more other event code subsets associated with preceding event data objects. For example, in an instance the primary event data object at position n within the ordered sequence includes one or more event codes also included within an immediately preceding event data object at position n−1 within the ordered sequence, the predictive data analysis computing entity 106 may determine the event category to be a bridge event category. As another example, in an instance the primary event code subset at position n includes one or more event codes also included in an event code subset at an mth position, where m inclusively includes any position between 1 and n−2, the predictive data analysis computing entity 106 may determine the event category to be a chronicle event category. As yet another example, in an instance the primary event code subset at position n only includes event codes which are not included within any preceding event code subset, the predictive data analysis computing entity 106 may determine an event category to be a new event category.

The related event data object may describe an event that is related to the primary event of interest for a particular user of interest. In particular, the related event data object may describe a related event code subset which includes one or more event codes and an event weight for each event code of the related event code subset. The event codes included in the related event code subset may correspond to a plurality of candidate event codes and may describe the particular event which pertains to the user of interest. As described above, the related event data object may be determined based at least in part on an event category for a primary event data object. For example, in an instance the event category for the primary event data object is determined to be a bridge event category, the related event data object may be determined to be the immediately preceding event data object in an ordered sequence of event data objects. As another example, in an instance the event category for the primary event data object is determined to be a chronicle event category, the related event data object is determined to be an mth preceding event data object in an ordered sequence of event data objects, where m is determined based at least in part on a predefined historical exploration hyperparameter for the ordered sequence. As yet another example, in an instance the event category for the primary event data object is determined to be a new event category, the related event data object is determined to be the same event data object as the primary event data object.

The predictive data analysis computing entity 106 may generate the target event data object based at least in part on the primary event data object and the related event data object. In particular, the predictive data analysis computing entity 106 may generate a target event code subset that includes the event codes from the primary event code subset corresponding to the primary event data object and the related event code subset corresponding to the related event data object. As described above, each event code of the primary event code subset and the related event code subset are associated with a particular event weight as described by the corresponding event data object. The predictive data analysis computing entity 106 may determine target event weight for each event code of the target event code subset. The target event weight may be determined for each event code based at least in part on the event weight as described by the primary event data object and/or related event data object. For example, in an instance a particular event code is included in both the primary event code subset and the related event code subset, the target event weight is the primary event code subset 901 and the related event code subset 1001. In some embodiments, the target event weight may be determined using one or more mathematical and/or logical operations. For example, in an instance both the primary event code subset and the related event code subset include an event code of "K56", the target event weight may be determined based at least in part on the event weight as described by both the primary event data object and the related event data object. As such, if a primary event data object describes an event weight of 0.285 for the event code "K56" and the related event data object describes an event weight of 0.305 for the event code "K56", the target event weight for the event code "K56" may be determined using the average of the event weights to yield a target event weight of 0.295.

FIG. 9 depicts an operational example of a primary event data object 900. The primary event data object 900 includes a primary event code subset 901, which includes one or more event codes. Each event code is associated with a particular event weight for the particular event. Additionally, FIG. 10 depicts an operational example of a related event data object 1000. The related event data object 1000 includes a related event code subset 1001, which includes one or more event codes and each event code is associated with a particular event weight. Furthermore, FIG. 11 depicts an operation example of a target event data object 1100. The target event data object 1100 includes a target event code subset 1101 which includes one or more event codes. The one or more event codes included in the target event code subset 1101 are based at least in part on the primary event code subset 901 and the related event code subset 1001. As such, each event code described by the primary event code subset 901 and the related event code subset 1001 are included in the target event code subset 1101. Furthermore, each event code of the target event code subset is associated with a target event weight. The target event weight is determined based at least in part on the event weight as described by both the primary event data object and the related event data object. For example, the event code "E66" of the target event code subset is included in the primary event code subset 901 but not the related event code subset 1001. As such, the target event code weight may be based directly on the event weight associated with the event code "E66" as described by the primary event data object. As another example, the event code "K56" of the target event code subset is included in both the primary event code subset 901 and the related event code subset 1001. As such, the target event code weight may be based at least in part on both the event weight associated with the event code "K56" as described by the primary event data object and the event weight associated with the event code "K56" as described by the related event data object. In some example embodiments, the predictive data analysis computing entity 106 may determine the target event weight based at least in part on the average of the event weights as described by the primary event data object and related event data object. As such, the predictive data analysis computing entity 106 may average the event weight of 0.285 for the event code "K56" of the primary event data object and the event weight of 0.305 for the event code "K56" for the related event data object and determine a target event weight of 0.295 for the noted event code "K56".

At step/operation 402, the predictive data analysis computing entity 106 determines a plurality of event code pairs. An event code pair may describe a first event code from the target event code subset and a second event code from the target event code subset. A plurality of event code pairs may be determined such that all combinations of event codes as described by the target event code subset are described. For example, if a target event code subset includes the event codes "K56" and "I10", a first event code pair may describe a first event code of "K56" and a second event code pair of "K56", a second event code pair may describe a first event code of "K56" and a second event code pair of "I10", a third event code pair may describe a first event code of "I10" and a second event code pair of "K56", and a fourth event code pair may describe a first event code of "I10" and a second event code pair of "I10".

FIG. 12 depicts an operational example of the plurality of event code pairs 1200. The plurality of event code pairs 1200 may be determined by the predictive data analysis computing entity 106 using the target event data object 1100 as depicted in FIG. 11. The plurality of event code pairs 1200 includes each unique combination of event codes described in the target event code subset 1101.

At step/operation 403, the predictive data analysis computing entity 106 determines a pairwise interaction score for each event code pair. In some embodiments, the predictive data analysis computing entity 106 may use a pairwise interaction score determination machine learning model to determine the pairwise interaction score for each event code pair. In some embodiments, the pairwise interaction score determination machine learning model may generate the pairwise interaction score for a particular event code pair based at least in part on the corresponding target event weight for the first event code and the corresponding target event weight for the second event code. The generated pairwise interaction score may be indicative of the significance of interaction between the event codes described by the particular event code pair. In some embodiments, the pairwise interaction score determination machine learning model may comprise a neural network. The output of the pairwise interaction score determination machine learning model may comprise a vector, where each value of the vector describes a pairwise interaction score for a particular event code pair. In some embodiments, the output of the pairwise interaction score determination machine learning model may comprise an atomic value that describes the pairwise interaction score for the particular event code pair. In some embodiments, the pairwise interaction score determination machine learning model may be trained using historical event code interaction data as described by historical event data objects.

At step/operation 404, the predictive data analysis computing entity 106 performs a computationally requisite number of event code space refinement iterations to generate a target anomaly detection matrix data object. The predictive data analysis computing entity 106 may perform any number of event code space refinement iterations until a terminal event code space refinement iteration is achieved. A terminal event code space refinement iteration may be the event code space iteration in which a generated anomaly detection matrix data object is determined to be a target anomaly detection matrix data object. In some embodiments, a target anomaly detection matrix data object may include zero values for each non-null value of the target anomaly detection matrix data object. In an instance the anomaly detection matrix data object generated during an event code space refinement iteration does not generate a target anomaly detection matrix data object, another event code space refinement iteration may be performed.

In some embodiments, step/operation 404 may be performed in accordance with the process that is depicted in FIG. 5, which is an example process for a particular event code space refinement iteration. The process that is depicted in FIG. 5 begins at step/operation 501 when the predictive data analysis computing entity 106 determines an event interaction matrix data object. The event interaction matrix data object may include one or more rows and one or more columns. Each row of the one or more rows may be associated with a row-wise event code that is selected from either the first event code or second event code of the event code pair. Each column of the one or more columns may be associated with a column-wise event code that is selected from either the first event code or second event code of the event code pair. In some embodiments, the one or more row-wise event codes are selected from the first event code and the one or more columns-wise event codes are selected from the second event code. Alternatively, the one or more column-wise event codes are selected from the first event code and the one or more row-wise event codes are selected from the second event code. For example, for an event code pair where "K56" is the first event code and "I10" is the second event code, a row-wise event code of the event interaction matrix data object may correspond to the event code "K56" and a column-wise event code of the event interaction matrix data object may correspond to the event code "I10". Alternatively, a column-wise event code of the event interaction matrix data object may correspond to the event code "K56" and a row-wise event code of the event interaction matrix data object may correspond to the event code "I10" for the event code pair. Additionally, the event interaction matrix data object includes one or more values. Each value of the event interaction matrix data object describes the pairwise interaction score whose first event code corresponds to the row-wise event code for the value and whose second event code corresponds to the column-wise event code for the value.

FIG. 13 depicts an operation example of an event interaction matrix data object 1300. The event interaction matrix data object 1300 includes one or more rows 1301 and one or more columns 1302, which are each associated with one or more row-wise event codes and one or more column-wise event codes, respectively. The event interaction matrix data object 1300 further includes one or more values 1303, which describe the pairwise interaction score whose first event code corresponds to the row-wise event code for the value and whose second event code corresponds to the column-wise event code for the value. For example, the value 1303 describes the pairwise interaction score whose first event code corresponds to the row-wise event code "R09" and whose second event code corresponds to the column-wise event code "N39".

At step/operation 502, the predictive data analysis computing entity 106 determines a row-wise interaction triangular matrix data object. The row-wise interaction triangular matrix may include one or more rows and one or more columns based at least in part on the corresponding event interaction matrix data object. Each row of the one or more rows may be associated with a row-wise event code and each column of the one or more columns may be associated with a column-wise event code as defined by the event interaction matrix data object.

In some embodiments, the predictive data analysis computing entity 106 may determine that one or more values of the row-wise interaction triangular matrix data object are null. The predictive data analysis computing entity 106 may determine that values that correspond to duplicate combinations of event codes are defined as null. For example, the predictive data analysis computing entity 106 may determine that a value of "0.71" corresponds to a row-wise event code of "E66" and a column-wise event code of "K56". As such, the predictive data analysis computing entity 106 may determine a null value corresponds to a column-wise event code of "E66" and a row-wise event code of "K56". In some embodiments, the predictive data analysis computing entity 106 may determine that values which correspond to the duplicate event codes are defined as null. For example, the predictive data analysis computing entity 106 may determine a value that corresponds to a row-wise event code of "K56" and a column-wise event code of "K56" is null. In some embodiments, the predictive data analysis computing entity 106 may determine values along and above a main diagonal associated with the row-wise interaction triangular matrix data object are null. In some embodiments, the predictive data analysis computing entity 106 may determine values along and below a main diagonal associated with the row-wise interaction triangular matrix data object are null.

The predictive data analysis computing entity 106 may determine a row-wise mean measure for each row of the event interaction matrix data object and a row-wise standard deviation measure for each row of the event interaction matrix data object. The predictive data analysis computing entity 106 may then determine each non-null value of the row-wise interaction triangular matrix data object based at least in part on the corresponding event interaction matrix value of the event interaction matrix data object, the row-wise mean measure for a corresponding row of the event interaction matrix data object, and the row-wise standard deviation measure for a corresponding row of the event interaction matrix data object.

FIG. 14 depicts an operational example of a row-wise interaction triangular matrix data object 1400. The row-wise interaction triangular matrix data object 1400 includes one or more rows 1401 and one or more columns 1402, which are each associated with one or more row-wise event codes and one or more column-wise event codes, respectively. The row-wise interaction triangular matrix data object 1400 further includes one or more values, which may include one or more non-null values and one or more null values. Here, the values at an above the main diagonal are selected as the null values.

In some embodiments, step/operation 502 may be performed in accordance with the process that is depicted in FIG. 6, which is an example process for determining non-null values of the row-wise interaction triangular matrix data object. The process that is depicted in FIG. 6 begins at step/operation 601 when the predictive data analysis computing entity 106 determines a row-wise mean measure for a corresponding event interaction matrix value for a particular non-null value of the row-wise interaction triangular matrix data object. In some embodiments, the predictive data analysis computing entity 106 may perform one or more mathematical and/or logical operations to determine a row-wise mean measure for each row of the row-wise interaction triangular matrix data object. For example, the predictive data analysis computing entity 106 may determine the average of the pairwise interaction scores which correspond to non-null values of the row-wise interaction triangular matrix data object and exclude pairwise interaction scores which correspond to null values of the row-wise interaction matrix data object.

Returning to the operational example depicted in FIG. 14, the predictive data analysis computing entity 106 may determine a row-wise mean measure for the value 1403 of the row-wise interaction triangular matrix data object 1400. The value 1403 of the row-wise interaction triangular matrix data object 1400 may correspond to an event interaction matrix data object value 1304 as depicted in FIG. 13. Although the row corresponding to the value 1304 of the event interaction matrix data object 1300 includes seven values, the five of those seven values correspond to null values within the row-wise interaction triangular matrix data object 1400. As such, the row-wise mean measure may be based at least in part on the two values 1304 and 1305 which correspond to non-null values of the row-wise interaction triangular matrix data object 1400. As such, the row-wise mean measure corresponding to the value 1403 may be determined by the average of the pairwise interaction score of value 1304 (i.e., 0.082) and 1305 (i.e., 0.074) to yield a row-wise mean measure of 0.078.

At step/operation 602, the predictive data analysis computing entity 106 determines a row-wise standard deviation measure for the corresponding event interaction matrix value for the particular non-null value of the row-wise interaction triangular matrix data object. In some embodiments, the predictive data analysis computing entity 106 may perform one or more mathematical and/or logical operations to determine a row-wise standard deviation measure for each row of the row-wise interaction triangular matrix data object. For example, the predictive data analysis computing entity 106 may determine the standard deviation of the pairwise interaction scores which correspond to non-null values of the row-wise interaction triangular matrix data object and exclude pairwise interaction scores which correspond to null values of the row-wise interaction matrix data object.

Returning to the operational example as depicted in FIG. 14, the predictive data analysis computing entity 106 may determine a row-wise standard deviation measure for the value 1403 of the row-wise interaction triangular matrix data object 1400. The value 1403 of the row-wise interaction triangular matrix data object 1400 may correspond to an event interaction matrix data object value 1304 as depicted in FIG. 13. Although the row corresponding to the value 1304 of the event interaction matrix data object 1300 includes seven values, the five of those seven values correspond to null values within the row-wise interaction triangular matrix data object 1400. As such, the row-wise mean measure may be based at least in part on the two values 1304 and 1305 which correspond to non-null values of the row-wise interaction triangular matrix data object 1400. As such, the row-wise mean measure corresponding to the value 1403 may be determined by the standard deviation of the pairwise interaction score of value 1304 (i.e., 0.082) and 1305 (i.e., 0.074) to yield a row-wise standard deviation measure of 0.006.

At step/operation 603, the predictive data analysis computing entity 106 determines a row-wise deviation measure for the particular non-null value of the row-wise interaction triangular matrix data object. The predictive data analysis computing entity 106 may determine a row-wise deviation measure for a particular non-null value of the row-wise interaction triangular matrix data object based at least in part on the corresponding event interaction matrix value and the corresponding row-wise mean measure value for the particular non-null value. In some embodiments, the predictive data analysis computing entity 106 may perform one or more mathematical and/or logical operations to determine the row-wise deviation measure for each non-null value of the row-wise interaction triangular matrix data object. In some embodiments, the row-wise deviation measure may be determined by the difference between the value of the event interaction matrix data object and the corresponding row-wise mean measure. For example, if a value of the event interaction matrix data object is 0.082 and the corresponding row-wise mean measure is 0.078, the row-wise deviation measure may be determined to be 0.004.

At step/operation 604, the predictive data analysis computing entity 106 determines the particular non-null value of the row-wise interaction triangular matrix data object. The predictive data analysis computing entity 106 may determine the particular non-null value of the row-wise interaction triangular matrix data object based at least in part on the row-wise deviation measure and the corresponding row-wise standard deviation for the particular non-null value. In some embodiments, the particular non-null value may be determined by the quotient of the row-wise deviation measure and the corresponding row-wise standard deviation measure. For example, if the row-wise deviation measure is determined to be 0.004 and the corresponding row-wise standard deviation for the particular non-null value is determined to be 0.006, the particular non-null value of the row-wise interaction triangular matrix data object may be determined to be 0.707.

Returning now to FIG. 5, at step/operation 503, the predictive data analysis computing entity 106 determines a column-wise interaction triangular matrix data object. The column-wise interaction triangular matrix may include one or more rows and one or more columns based at least in part on the corresponding event interaction matrix data object. Each row of the one or more rows may be associated with a row-wise event code and each column of the one or more columns may be associated with a column-wise event code as defined by the event interaction matrix data object.

In some embodiments, the predictive data analysis computing entity 106 may determine that one or more values of the column-wise interaction triangular matrix data object are null. The predictive data analysis computing entity 106 may determine that values that correspond to duplicate combinations of event codes are defined as null. For example, the predictive data analysis computing entity 106 may determine that a value of "−0.387" corresponds to a row-wise event code of "E66" and a column-wise event code of "K56". As such, the predictive data analysis computing entity 106 may determine a null value corresponds to a column-wise event code of "E66" and a row-wise event code of "K56". In some embodiments, the predictive data analysis computing entity 106 may determine that values which correspond to the duplicate event codes are defined as null. For example, the predictive data analysis computing entity 106 may determine a value that corresponds to a row-wise event code of "K56" and a column-wise event code of "K56" is null. In some embodiments, the predictive data analysis computing entity 106 may determine values along and above a main diagonal associated with the column-wise interaction triangular matrix data object are null. In some embodiments, the predictive data analysis computing entity 106 may determine values along and below a main diagonal associated with the column-wise interaction triangular matrix data object are null.

The predictive data analysis computing entity 106 may determine a column-wise mean measure for each row of the event interaction matrix data object and a column-wise standard deviation measure for each column of the event interaction matrix data object. The predictive data analysis computing entity 106 may then determine each non-null value of the column-wise interaction triangular matrix data object based at least in part on the corresponding event interaction matrix value of the event interaction matrix data object, the column-wise mean measure for a corresponding row of the event interaction matrix data object, and the column-wise standard deviation measure for a corresponding column of the event interaction matrix data object.

FIG. 15 depicts an operational example of a column-wise interaction triangular matrix data object 1500. The column-wise interaction triangular matrix data object 1500 includes one or more rows 1501 and one or more columns 1502, which are each associated with one or more row-wise event codes and one or more column-wise event codes, respectively. The column-wise interaction triangular matrix data object 1500 further includes one or more values, which may include one or more non-null values and one or more null values. Here, the values at an above the main diagonal are selected as the null values.

In some embodiments, step/operation 503 may be performed in accordance with the process that is depicted in FIG. 7, which is an example process for determining non-null values of the column-wise interaction triangular matrix data object. The process that is depicted in FIG. 7 begins at step/operation 701 when the predictive data analysis computing entity 106 determines a column-wise mean measure for a corresponding event interaction matrix value for a particular non-null value of the column-wise interaction triangular matrix data object. In some embodiments, the predictive data analysis computing entity 106 may perform one or more mathematical and/or logical operations to determine a column-wise mean measure for each column of the column-wise interaction triangular matrix data object. For example, the predictive data analysis computing entity 106 may determine the average of the pairwise interaction scores which correspond to non-null values of the column-wise interaction triangular matrix data object and exclude pairwise interaction scores which correspond to null values of the column-wise interaction matrix data object.

Returning to the operational example as depicted in FIG. 15, the predictive data analysis computing entity 106 may determine a column-wise mean measure for the value 1503 of the column-wise interaction triangular matrix data object 1500. The value 1503 of the column-wise interaction triangular matrix data object 1500 may correspond to an event interaction matrix data object value 1304 as depicted in FIG. 13. Although the column corresponding to the value 1304 of the event interaction matrix data object 1300 includes seven values, the one of those seven values correspond to null values within the column-wise interaction triangular matrix data object 1500. As such, the column-wise mean measure may be based at least in part on the six values corresponding to column 1306 with the exception of the top-most value, which correspond to non-null values of the column-wise interaction triangular matrix data object 1500. As such, the column-wise mean measure corresponding to the value 1503 may be determined by the average of the pairwise interaction score of value 1304 (i.e., 0.082) and the values corresponding to column 1306 with the exception of the top-most value (i.e., 0.079, 0.085, 0.083, 0.123, 0.080) to yield a column-wise mean measure of 0.09.

At step/operation 702, the predictive data analysis computing entity 106 determines a column-wise standard deviation measure for the corresponding event interaction matrix value for the particular non-null value of the column-wise interaction triangular matrix data object. In some embodiments, the predictive data analysis computing entity 106 may perform one or more mathematical and/or logical operations to determine a column-wise standard deviation measure for each column of the column-wise interaction triangular matrix data object. For example, the predictive data analysis computing entity 106 may determine the standard deviation of the pairwise interaction scores which correspond to non-null values of the column-wise interaction triangular matrix data object and exclude pairwise interaction scores which correspond to null values of the column-wise interaction matrix data object.

Returning to the operational example as depicted in FIG. 15, the predictive data analysis computing entity 106 may determine a column-wise standard deviation measure for the value 1503 of the column-wise interaction triangular matrix data object 1500. The value 1503 of the column-wise interaction triangular matrix data object 1500 may correspond to an event interaction matrix data object value 1304 as depicted in FIG. 13. Although the column corresponding to the value 1304 of the event interaction matrix data object 1300 includes seven values, the one of those seven values correspond to null values within the column-wise interaction triangular matrix data object 1500. As such, the column-wise mean measure may be based at least in part on the six values corresponding to column 1306 with the exception of the top-most value, which correspond to non-null values of the column-wise interaction triangular matrix data object 1500. As such, the column-wise mean measure corresponding to the value 1503 may be determined by the standard deviation of the pairwise interaction score of value 1304 (i.e., 0.082) and the values corresponding to column 1306 with the exception of the top-most value (i.e., 0.079, 0.085, 0.083, 0.123, 0.080) to yield a column-wise standard deviation measure of 0.02.

At step/operation 603, the predictive data analysis computing entity 106 determines a column-wise deviation measure for the particular non-null value of the column-wise interaction triangular matrix data object. The predictive data analysis computing entity 106 may determine a column-wise deviation measure for a particular non-null value of the column-wise interaction triangular matrix data object based at least in part on the corresponding event interaction matrix value and the corresponding column-wise mean measure value for the particular non-null value. In some embodiments, the predictive data analysis computing entity 106 may perform one or more mathematical and/or logical operations to determine the column-wise deviation measure for each non-null value of the column-wise interaction triangular matrix data object. In some embodiments, the column-wise deviation measure may be determined by the difference between the value of the event interaction matrix data object and the corresponding column-wise mean measure. For example, if a value of the event interaction matrix data object is 0.082 and the corresponding column-wise mean measure is 0.089, the column-wise deviation measure may be determined to be −0.007.

At step/operation 604, the predictive data analysis computing entity 106 determines the particular non-null value of the column-wise interaction triangular matrix data object. The predictive data analysis computing entity 106 may determine the particular non-null value of the column-wise interaction triangular matrix data object based at least in part on the column-wise deviation measure and the corresponding column-wise standard deviation for the particular non-null value. In some embodiments, the particular non-null value may be determined by the quotient of the column-wise deviation measure and the corresponding column-wise standard deviation measure. For example, if the column-wise deviation measure is determined to be −0.007 and the corresponding column-wise standard deviation for the particular non-null value is determined to be 0.017, the particular non-null value of the column-wise interaction triangular matrix data object may be determined to be −0.387.

Returning now to FIG. 5, at step/operation 504, the predictive data analysis computing entity 106 generates an anomaly detection matrix data object. The anomaly detection matrix data object may include one or more rows and one or more columns. Each row of the one or more rows may be associated with a row-wise event code that is selected from either the first event code or second event code of the event code pair. Each column of the one or more columns may be associated with a column-wise event code that is selected from either the first event code or second event code of the event code pair. The anomaly detection matrix data object may include one or more values, including one or more non-null values and one or more null values. Each value of one or more values of the anomaly detection matrix data object may be determined based at least in part on a corresponding row-wise matrix value of the row-wise interaction triangular matrix data object and a corresponding column-wise matrix value of the column-wise interaction triangular matrix data object.

In some embodiments, step/operation 504 may be performed in accordance with the process that is depicted in FIG. 8, which is an example process for determining non-null values of the anomaly detection matrix data object. Although FIG. 8 depicts the step/operations in a particular order, as will be appreciated by one of skill in the art, step/operations 802-808 may be performed in any suitable order.

The process that is depicted in FIG. 8 begins at step/operation 801 when the predictive data analysis computing entity 106 determines one or more interaction significance thresholds. In some embodiments, the one or more interaction significance thresholds are dynamically determined by predictive data analysis computing entity 106. For example, the predictive data analysis computing entity 106 may determine the one or more interaction significance thresholds using one or more statistically significant determination algorithms, such as standard deviation, p-tests, t-tests, analysis of variance (ANOVA), chi-square tests, and/or the like. In some embodiments, the one or more interaction significance thresholds may be manually set by one or more authorized users. A non-null value of either the row-wise interaction triangular matrix data object and/or column-wise interaction triangular matrix data object may be compared to the one or more interaction significance thresholds to determine whether the particular non-null value satisfies the one or more interaction significance thresholds. For example, the one or more interaction significance thresholds may be 1.64 and −1.64 such that any values less than −1.64 and greater than 1.64 are determined to satisfy the one or more interaction significance thresholds.

At step/operation 802, the predictive data analysis computing entity 106 determines whether only a corresponding row-wise value of a row-wise interaction triangular matrix data object satisfies the one or more interaction significance thresholds. In an instance only a corresponding row-wise matrix value satisfies the one or more interaction significance thresholds, the predictive data analysis computing entity 106 proceeds to step/operation 803 and determines the particular non-null value has a first value. For example, a value of anomaly detection matrix data object which corresponds to a row-wise value of a row-wise interaction triangular matrix data object which satisfies the one or more interaction significance thresholds and corresponds to a column-wise value of a column-wise interaction triangular matrix data object which does not satisfy the one or more interaction significance thresholds may be assigned a value of "1".

In an instance only the corresponding row-wise matrix value does not satisfy the one or more interaction significance thresholds, the predictive data analysis computing entity 106 proceeds to step/operation 804 and determines whether only a corresponding column-wise value of a column-wise interaction triangular matrix data object satisfies the one or more interaction significance thresholds. In an instance only a corresponding column-wise matrix value satisfies the one or more interaction significance thresholds, the predictive data analysis computing entity 106 proceeds to step/operation 805 and determines the particular non-null value has a second value. The second value may be different than the first value. For example, a value of anomaly detection matrix data object which corresponds to a column-wise value of a column-wise interaction triangular matrix data object which satisfies the one or more interaction significance thresholds and corresponds to a row-wise value of a row-wise interaction triangular matrix data object which does not satisfy the one or more interaction significance thresholds may be assigned a value of "2".

In an instance only the corresponding column-wise matrix value does not satisfy the one or more interaction significance thresholds, the predictive data analysis computing entity 106 proceeds to step/operation 806 and determines whether both the corresponding row-wise value of a row-wise interaction triangular matrix data object and corresponding column-wise value of a column-wise interaction triangular matrix data object satisfies the one or more interaction significance thresholds. In an instance both the corresponding row-wise matrix value satisfies the one or more interaction significance thresholds and the corresponding column-wise matrix value satisfies the one or more interaction significance thresholds, the predictive data analysis computing entity 106 proceeds to step/operation 807 and determines the particular non-null value has a third value. The third value may be different from both the first value and second value. For example, a value of anomaly detection matrix data object which corresponds to a row-wise value of a row-wise interaction triangular matrix data object which satisfies the one or more interaction significance thresholds and corresponds to a column-wise value of a column-wise interaction triangular matrix data object which satisfies the one or more interaction significance thresholds may be assigned a value of "3".

In an instance neither the corresponding row-wise matrix value and corresponding column-wise matrix value satisfy the one or more interaction significance thresholds, the predictive data analysis computing entity 106 proceeds to step/operation 808 and determines the particular non-null value has a fourth value. The fourth value may be different from the first value, second value, and third value. For example, a value of anomaly detection matrix data object which corresponds to a row-wise value of a row-wise interaction triangular matrix data object which does not satisfy the one or more interaction significance thresholds and corresponds to a column-wise value of a column-wise interaction triangular matrix data object which does not satisfy the one or more interaction significance thresholds may be assigned a value of "0".

Returning now to FIG. 5, At step/operation 505, the predictive data analysis computing entity 106 determines whether the anomaly detection matrix data object is a target anomaly detection matrix data object. The predictive data analysis computing entity 106 may determine the generated detection matrix data object is a target anomaly detection matrix data object if each non-null value of the anomaly detection matrix data object is a zero value.

FIG. 16 depicts an operational example of an anomaly detection matrix data object 1600. The one or more non-null values of the anomaly detection matrix data object 1600 may be any one of a first value, second value, third value, or fourth value. Here, the anomaly detection matrix data object 1600 contains non-zero, non-null values and thus is not a target anomaly detection matrix data object 1700. FIG. 17 depicts an operational example of a target anomaly detection matrix data object 1700. The one or more non-null values of the anomaly detection matrix data object 1700 are all zero values and thus, is determined to be the target anomaly detection matrix data object 1700.

In an instance the anomaly detection matrix data object is not a target anomaly detection matrix data object, the predictive data analysis computing entity 106 proceeds to step/operation 507, where the predictive data analysis computing entity 106 updates a target event code subset. The target event code subset may be updated to remove n target event codes from the target event code subset. The n target event codes removed from the target event code subset may include any event code which is associated with a row-wise event code and/or column-wise event code which corresponds to a non-null, non-zero value. In some embodiments, one or more event codes associated with a row-wise event code and/or column-wise event code which corresponds to a non-null, non-zero value are removed from the target event code subset. In some embodiments, each event code associated with a row-wise event code and/or column-wise event code which corresponds to a non-null, non-zero value is removed from the target event code subset.

For example, referring to FIG. 16, the non-null value 1601 of the anomaly detection matrix data object 1600 is a non-zero value. The non-null value 1601 corresponds to a row-wise event code of "N39" and a column-wise event code of "K56". As such the event codes "N39" and/or "K56" may be removed from the target event code subset.

In an instance the anomaly detection matrix data object is a target anomaly detection matrix data object, the predictive data analysis computing entity 106 proceeds to step/operation 506, where the predictive data analysis computing entity 106 generates the target anomaly detection matrix data object. Additionally, the event code space refinement iteration which generated the target anomaly detection matrix data object is determined to be the terminal event code space refinement iteration.

Returning now to FIG. 4, at step/operation 405, the predictive data analysis computing entity 106 determines an anomalous code subset of the plurality of event codes. The predictive data analysis computing entity 106 may determine the anomalous code subset based at least in part on the n target event codes for the terminal event code space refinement iteration. For example, if the event codes "K56" and "I10" were the target event codes removed from the target event code subset during the terminal event code space refinement iteration, the anomalous code subset may include the event codes "K56" and "I10".

At step/operation 406, the predictive data analysis computing entity 106 performs one or more actions (e.g., one or more prediction-based actions). In some embodiments, the one or more actions include generating an alert notification indicative of the event codes included in the anomalous event code subset. The alert notification may be provided to one or more client computing entities 102 such the one or more end users may be aware of the anomalous event codes within the primary event data object. As such, the one or more users may automatically be informed of event data objects determined to have anomalous event codes without manually reviewing each event data object. In some embodiments, at least one action may be performed based at least in part on the utility index for at least one event (e.g., an event corresponding to a claim, an event corresponding to delivery of a particular medical service, an event corresponding to a hospitalization, and/or the like), where the utility index may be determined using the equation $Ut_i = \Sigma_{j=1}^{n_i} IDW_{ij}/(L_i)$, where $Ut_i$ is the utility index for the ith event, j is an index variable that iterates over $n_i$ event codes of the ith event, $IDW_{ij}$ is the event weight for the ith event and the jth event code, and $L_i$ is a duration measure (e.g., a hospital length of stay measure) for the ith event. In some embodiments, at least one action may be performed based at least in part on a utility shift index for at least one event (e.g., an event corresponding to a claim, an event corresponding to delivery of a particular medical service, an event corresponding to a hospitalization, and/or the like), where the utility shift index may be determined using the equation $SU_i = Ut_i/Ut_{i-1}$ (i=2, 3, . . . t), where $SU_i$ is the utility shift measure for the ith event, $Ut_i$ is the utility index for the ith event, and $Ut_{i-1}$ is the utility index for the (i−1)th event before the ith event, where i may be a pre-defined hyper-parameter of the predictive data analysis system 101.

FIG. 18 depicts an operational example of an alert notification 1800. The alert notification 1800 may be indicative of the particular event data object (i.e., the primary event data object) and information pertaining to the event data object (time, date, etc.) associated with the anomalous event codes. The alert notification 1800 may further be indicative of the particular user of interest, such as a patient associated with the event data object. The alert notification 1800 may additionally be indicative of the anomalous event codes detected.

In some embodiments, the one or more actions may include dynamic detection and/or monitoring of the number of anomalous event codes for one or more users of interest and/or one or more primary event data objects. As such the predictive data analysis computing entity 106 may perform predictive computational load balancing to prevent overloading of computational resources configured to process anomalous event codes and ensure efficient computational resource distribution between a plurality of computing entities configured to process anomalous event codes.

An example of an action that can be performed based at least in part on the anomaly detection output data described herein relates to performing operational load balancing for anomaly handling systems. Various embodiments of the present invention address technical challenges related to enhancing operational reliability of anomaly handling systems by performing anomaly detection techniques that enable early detection of the number of anomaly cases provided to the anomaly handling systems. In some embodiments, by early detection of the number of anomaly cases provided to the anomaly handling systems, various embodiments of the present invention enable performing operational load balancing for the anomaly handling systems by allocating the right amount of computational resources and deallocating unnecessary computational resources. In this way, various embodiments of the present invention enhance operational reliability and resource usage efficiency of anomaly handling systems.

Accordingly, various embodiments of the present invention enable predictive anomaly detection with respect to a primary event data object. The disclosed techniques enable using a pairwise interaction score machine learning model to determine a pairwise interaction score for each event code pair of a plurality of event code pairs indicative of the significance of interaction between the event codes described by the particular event code pair. The pairwise interaction score may be used in part to generate an anomaly detection matrix data object, which may in turn be used to determine an anomalous code subset which includes one or more anomalous event codes. As such, this allows for dynamic and predictive detection of anomalous event codes within a primary event data object and thus avoids the need for manual review. Furthermore, this allows for the early detection of anomalous event codes which reduces the expenditure of computation resource at a later time after the anomalous event codes have been processed. As such, the disclosed techniques for predictive anomaly detection improve effectiveness and efficiency of various predictive data analysis operations. In doing so, various embodiments of the present invention make further important technical contributions to the fields of predictive data analysis and machine learning.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
generating, by one or more processors, a target event data object, wherein: (i) the target event data object comprises a target event code subset, (ii) the target event code subset comprises event codes described by a primary event code subset corresponding to a primary event data object and a related event code subset corresponding to a related event data object, (iii) the primary event code subset and related event code subset each comprise one or more event codes and each event code of the primary event code subset and related event code subset is associated with an event weight, and (iv) each event code of the target event code subset is associated with a target event weight;
determining, by one or more processors, a plurality of event code pairs, wherein each event code pair is associated with a first event code and a second event code;
for each event code pair, determining, by the one or more processors and using a pairwise interaction score determination machine learning model, a pairwise interaction score based at least in part on a first corresponding target event weight for the first event code associated with the event code pair and a second corresponding target event weight for the second event code associated with the event code pair;
performing, by the one or more processors, a computationally requisite number of event code space refinement iterations until a terminal event code space refinement iteration in which a target anomaly detection matrix data object is generated, wherein performing a particular event code space refinement iteration comprises:
during each non-initial event code space refinement iteration, updating the target event code subset generated by a preceding event code space refinement iteration to remove n target event codes;
determining an event interaction matrix data object, wherein: (i) each row of the event interaction matrix data object is associated with a row-wise event code that is selected from either the first event code or second event code of the event code pair, (ii) each column of the event interaction matrix data object is associated with a column-wise event code that is selected from either the first event code or second event code of the event code pair, and (iii) each value of the event interaction matrix data object describes the pairwise interaction score whose first event code corresponds to the row-wise event code for the value and whose second event code corresponds to the column-wise event code for the value;
determining a row-wise interaction triangular matrix data object, wherein each non-null value of the row-wise interaction triangular matrix data object is determined based at least in part on a corresponding event interaction matrix value of the event interaction matrix data object, a row-wise mean measure for a corresponding row of the event interaction matrix data object, and a row-wise standard deviation measure for a corresponding row of the event interaction matrix data object;
determining a column-wise interaction triangular matrix data object, wherein each non-null value of the column-wise interaction triangular matrix data object is determined based at least in part on the corresponding event interaction matrix value of the event interaction matrix data object, a column-wise mean measure for a corresponding row of the event interaction matrix data object, and a column-wise standard deviation measure for a corresponding row of the event interaction matrix data object; and
generating an anomaly detection matrix data object, wherein each non-null value of the anomaly detection matrix data object is determined based at least in part on a corresponding row-wise matrix value of the row-wise interaction triangular matrix data object and a corresponding column-wise matrix value of the column-wise interaction triangular matrix data object;

determining, by the one or more processors, an anomalous code subset of the plurality of event code pairs based at least in part on the n target event codes for the terminal event code space refinement iteration; and initiating, by the one or more processors, the performance of one or more actions based at least in part on the anomalous code subset.

2. The computer-implemented method of claim 1, wherein:
the related event data object is determined based at least in part on an event category for the primary event data object, and
the event category is selected from a plurality of candidate event categories.

3. The computer-implemented method of claim 2, wherein, responsive to determining that an event category is a bridge event category, the related event data object is an immediately preceding event data object in an ordered sequence of event data objects.

4. The computer-implemented method of claim 2, wherein:
responsive to determining that an event category is a chronicle event category, the related event data object is an mth preceding event data object in an ordered sequence of event data objects, and
m is determined based at least in part on a predefined historical exploration hyper-parameter for the ordered sequence of event data objects.

5. The computer-implemented method of claim 1, wherein, during the particular event code space refinement iteration, determining a particular non-null value of the anomaly detection matrix data object comprises:
determining an interaction significance threshold;
determining that the particular non-null value has a first value in an instance where only the corresponding row-wise matrix value for the particular non-null value satisfies the interaction significance threshold;
determining that the particular non-null value has a second value in an instance where only the corresponding column-wise matrix value for the particular non-null value satisfies the interaction significance threshold;
determining that the particular non-null value has a third value in an instance where both the corresponding column-wise matrix value for the particular non-null value satisfies the interaction significance threshold and the corresponding column-wise matrix value for the particular non-null value satisfies the interaction significance threshold; and
determining that the particular non-null value has a fourth value in an instance where neither the corresponding column-wise matrix value for the particular non-null value satisfies the interaction significance threshold nor the corresponding column-wise matrix value for the particular non-null value satisfies the interaction significance threshold.

6. The computer-implemented method of claim 1, wherein each non-null value of the target anomaly detection matrix data object is a zero value.

7. The computer-implemented method of claim 1, wherein determining a particular non-null value of the row-wise interaction triangular matrix data object comprises:
determining the row-wise standard deviation measure for the corresponding event interaction matrix value of the particular non-null value and the row-wise mean measure of the particular non-null value; and
determining the particular non-null value based at least in part on the row-wise mean measure and the row-wise standard deviation measure for the particular non-null value.

8. The computer-implemented method of claim 1, wherein determining a particular non-null value of the column-wise interaction triangular matrix data object comprises:
determining the column-wise standard deviation measure for the corresponding event interaction matrix value of the particular non-null value and the column-wise mean measure of the particular non-null value; and
determining the particular non-null value based at least in part on the column-wise mean measure and the column-wise standard deviation measure for the particular non-null value.

9. The computer-implemented method of claim 1, wherein determining a target event weight for an event code of the target event code subset comprises:
determining a particular event code is included in both the primary event code subset and the related event code subset; and
in an instance the particular event code is included in both the primary event code subset and the related event code subset, determining the target event weight based at least in part on both the event weight corresponding to the primary event code subset and the event weight corresponding to the related event code subset.

10. A system comprising memory and one or more processors, the one or more processors configured to:
generate a target event data object, wherein: (i) the target event data object comprises a target event code subset, (ii) the target event code subset comprises event codes described by a primary event code subset corresponding to a primary event data object and a related event code subset corresponding to a related event data object, (iii) the primary event code subset and related event code subset each comprise one or more event codes and each event code of the primary event code subset and related event code subset is associated with an event weight, and (iv) each event code of the target event code subset is associated with a target event weight;
determine a plurality of event code pairs, wherein each event code pair is associated with a first event code and a second event code;
for each event code pair, determine, using a pairwise interaction score determination machine learning model, a pairwise interaction score based at least in part on the corresponding target event weight for the first event code associated with the event code pair and the corresponding target event weight for the second event code associated with the event code pair;
perform a computationally requisite number of event code space refinement iterations until a terminal event code space refinement iteration in which a target anomaly detection matrix data object is generated, wherein performing a particular event code space refinement iteration comprises:
during each non-initial event code space refinement iteration, update the target event code subset generated by a preceding event code space refinement iteration to remove n target event codes;
determine an event interaction matrix data object, wherein: (i) each row of the event interaction matrix data object is associated with a row-wise event code that is selected from either the first event code or second event code of the event code pair, (ii) each column of the event interaction matrix data object is associated with a column-wise event code that is selected from either the first event code or second event code of the event code pair, and (iii) each value of the event interaction matrix data object describes the pairwise interaction score whose first event code corresponds to the row-wise event code for the value and whose second event code corresponds to the column-wise event code for the value;

determine a row-wise interaction triangular matrix data object, wherein each non-null value of the row-wise interaction triangular matrix data object is determined based at least in part on a corresponding event interaction matrix value of the event interaction matrix data object, a row-wise mean measure for a corresponding row of the event interaction matrix data object, and a row-wise standard deviation measure for a corresponding row of the event interaction matrix data object;

determine a column-wise interaction triangular matrix data object, wherein each non-null value of the column-wise interaction triangular matrix data object is determined based at least in part on the corresponding event interaction matrix value of the event interaction matrix data object, a column-wise mean measure for a corresponding row of the event interaction matrix data object, and a column-wise standard deviation measure for a corresponding row of the event interaction matrix data object; and generate an anomaly detection matrix data object, wherein each non-null value of the anomaly detection matrix data object is determined based at least in part on a corresponding row-wise matrix value of the row-wise interaction triangular matrix data object and a corresponding column-wise matrix value of the column-wise interaction triangular matrix data object;

determine an anomalous code subset of the plurality of event code pairs based at least in part on the n target event codes for the terminal event code space refinement iteration; and initiate the performance of one or more actions based at least in part on the anomalous code subset.

11. The system of claim 10, wherein:
the related event data object is determined based at least in part on an event category for the primary event data object, and
the event category is selected from a plurality of candidate event categories.

12. The system of claim 11, wherein, in response to determining that an event category is a bridge event category, then the related event data object is an immediately preceding event data object in an ordered sequence of event data objects.

13. The apparatus of claim 11, wherein:
in response to determining that an event category is a chronicle event category, then the related event data object is an mth preceding event data object in an ordered sequence of event data objects, and
m is determined based at least in part on a predefined historical exploration hyper-parameter for the ordered sequence of event data objects.

14. The system of claim 10, wherein, the one or more processors are further configured to, during the particular event code space refinement iteration, determining a particular non-null value of the anomaly detection matrix data object:

determine an interaction significance threshold;
determine that the particular non-null value has a first value in an instance where only the corresponding row-wise matrix value for the particular non-null value satisfies the interaction significance threshold;
determine that the particular non-null value has a second value in an instance where only the corresponding column-wise matrix value for the particular non-null value satisfies the interaction significance threshold;
determine that the particular non-null value has a third value in an instance where both the corresponding column-wise matrix value for the particular non-null value satisfies the interaction significance threshold and the corresponding column-wise matrix value for the particular non-null value satisfies the interaction significance threshold; and
determine that the particular non-null value has a fourth value in an instance where neither the corresponding column-wise matrix value for the particular non-null value satisfies the interaction significance threshold nor the corresponding column-wise matrix value for the particular non-null value satisfies the interaction significance threshold.

15. The system of claim 10, wherein each non-null value of the target anomaly detection matrix data object is a zero value.

16. The system of claim 10, wherein one or more processors are further configured to, when determining a particular non-null value of the row-wise interaction triangular matrix data object:
determine row-wise standard deviation measure for the corresponding event interaction matrix value of the particular non-null value and the row-wise mean measure of the particular non-null value; and
determine the particular non-null value based at least in part on the row-wise mean measure and the row-wise standard deviation measure for the particular non-null value.

17. The system of claim 10, wherein the one or more processors are further configured to, when determining a particular non-null value of the column-wise interaction triangular matrix data object:
determine the column-wise standard deviation measure for the corresponding event interaction matrix value of the particular non-null value and the column-wise mean measure of the particular non-null value; and
determine the particular non-null value based at least in part on the column-wise mean measure and the column-wise standard deviation measure for the particular non-null value.

18. The system of claim 10, wherein one or more processors are further configured to, when determining a target event weight for an event code of the target event code subset:
determine a particular event code is included in both the primary event code subset and the related event code subset; and
in an instance the particular event code is included in both the primary event code subset and the related event code subset, determine the target event weight based at least in part on both the event weight corresponding to the primary event code subset and the event weight corresponding to the related event code subset.

19. One or more computer-readable storage media comprising instructions that, when executed by one or more processors, cause the one or more processors to:

generate a target event data object, wherein: (i) the target event data object comprises a target event code subset, (ii) the target event code subset comprises event codes described by a primary event code subset corresponding to a primary event data object and a related event code subset corresponding to a related event data object, (iii) the primary event code subset and related event code subset each comprise one or more event codes and each event code of the primary event code subset and related event code subset is associated with an event weight, and (iv) each event code of the target event code subset is associated with a target event weight;

a plurality of event code pairs, wherein each event code pair is associated with a first event code and a second event code;

for each event code pair, determine, using a pairwise interaction score determination machine learning model, a pairwise interaction score based at least in part on the corresponding target event weight for the first event code associated with the event code pair and the corresponding target event weight for the second event code associated with the event code pair;

perform a computationally requisite number of event code space refinement iterations until a terminal event code space refinement iteration in which a target anomaly detection matrix data object is generated, wherein performing a particular event code space refinement iteration comprises:

during each non-initial event code space refinement iteration, update the target event code subset generated by a preceding event code space refinement iteration to remove n target event codes;

determine an event interaction matrix data object, wherein: (i) each row of the event interaction matrix data object is associated with a row-wise event code that is selected from either the first event code or second event code of the event code pair, (ii) each column of the event interaction matrix data object is associated with a column-wise event code that is selected from either the first event code or second event code of the event code pair, and (iii) each value of the event interaction matrix data object describes the pairwise interaction score whose first event code corresponds to the row-wise event code for the value and whose second event code corresponds to the column-wise event code for the value;

determine a row-wise interaction triangular matrix data object, wherein each non-null value of the row-wise interaction triangular matrix data object is determined based at least in part on a corresponding event interaction matrix value of the event interaction matrix data object, a row-wise mean measure for a corresponding row of the event interaction matrix data object, and a row-wise standard deviation measure for a corresponding row of the event interaction matrix data object;

determine a column-wise interaction triangular matrix data object, wherein each non-null value of the column-wise interaction triangular matrix data object is determined based at least in part on the corresponding event interaction matrix value of the event interaction matrix data object, a column-wise mean measure for a corresponding row of the event interaction matrix data object, and a column-wise standard deviation measure for a corresponding row of the event interaction matrix data object; and generate an anomaly detection matrix data object, wherein each non-null value of the anomaly detection matrix data object is determined based at least in part on a corresponding row-wise matrix value of the row-wise interaction triangular matrix data object and a corresponding column-wise matrix value of the column-wise interaction triangular matrix data object;

determine an anomalous code subset of the plurality of event code pairs based at least in part on the n target event codes for the terminal event code space refinement iteration; and initiate the performance of one or more actions based at least in part on the anomalous code subset.

20. The one or more computer-readable storage media of claim 19, wherein:

the related event data object is determined based at least in part on an event category for the primary event data object, and the event category is selected from a plurality of candidate event categories.

* * * * *

UNITED STATES PATENT AND TRADEMARK OFFICE
CERTIFICATE OF CORRECTION

Page 1 of 1

PATENT NO. : 11,914,506 B2
APPLICATION NO. : 17/678804
DATED : February 27, 2024
INVENTOR(S) : Sanjay K. Dwivedi et al.

It is certified that error appears in the above-identified patent and that said Letters Patent is hereby corrected as shown below:

In the Claims

In Column 34, Line 3, Claim 1, delete "by one" and insert -- by the one --, therefor.

In Column 37, Line 55, Claim 13, delete "The apparatus" and insert -- The system --, therefor.

In Column 38, Line 28, Claim 16, delete "wherein one" and insert -- wherein the one --, therefor.

In Column 38, Line 52, Claim 18, delete "wherein one" and insert -- wherein the one --, therefor.

In Column 39, Line 14, Claim 19, delete "a plurality" and insert -- determine a plurality --, therefor.

Signed and Sealed this
Twenty-third Day of July, 2024

Katherine Kelly Vidal
*Director of the United States Patent and Trademark Office*